(12) United States Patent
Conklin

(10) Patent No.: US 6,731,818 B1
(45) Date of Patent: May 4, 2004

(54) SYSTEM AND METHOD FOR GENERATING VIDEO FRAMES

(75) Inventor: Greg Conklin, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 09/345,686

(22) Filed: Jun. 30, 1999

(51) Int. Cl.⁷ .................................................. G06K 9/40
(52) U.S. Cl. ...................................... 382/254; 382/261
(58) Field of Search ............................... 382/254–269;
348/536–538

(56) References Cited

U.S. PATENT DOCUMENTS

| 4,383,272 A | 5/1983 | Netraveli et al. | 358/136 |
| 5,592,226 A | 1/1997 | Lee et al. | 358/413 |
| 5,642,239 A | 6/1997 | Nagai | 360/8 |
| 5,699,499 A | 12/1997 | Kawada et al. | 395/175 |
| 5,734,435 A | 3/1998 | Wilson et al. | 348/459 |
| 5,831,677 A | 11/1998 | Streater | 348/415 |

FOREIGN PATENT DOCUMENTS

| EP | 0294957 | 12/1988 |
| EP | 0391094 | 10/1990 |
| EP | 0596732 | 11/1993 |
| EP | 0634871 | 7/1994 |
| EP | 0781041 | 6/1997 |
| EP | 0883298 | 6/1998 |
| WO | WO 97/46020 | 12/1997 |
| WO | WO 99/25122 | 5/1999 |
| WO | WO 99/52281 | 10/1999 |

OTHER PUBLICATIONS

Chen, et al., "Source Model for Transform Video Coder and Its Application—Part II: Variable Frame Rate Coding" IEEE Transactions on Circuits and Systems for Video Technology, vol. 7, No. 2, Apr. 1997.

Haavisto, et al. "Motion Adaptive Scan Rate Up–Conversion", Multidimensional Systems and Signal Processing, vol. 3, 1992.

(List continued on next page.)

Primary Examiner—Thomas D. Lee
Assistant Examiner—Stephen Brinich
(74) Attorney, Agent, or Firm—Steven Stewart, Esq.

(57) ABSTRACT

System and method for generating video frames. The system includes a frame generator which generates one or more intermediate frames based upon one base frames. Each of the base frames are comprised of a plurality of macroblocks. Furthermore, one or more of the macroblocks have a motion vector. The macroblocks are comprised of a plurality of pixels. In the frame generation process, the frame generator performs a number of steps such as: (i) determines whether frame generation is appropriate, (ii) examines the first and second base frames to check for the presence of textual characters, (iii) selects a frame generation method based upon information in the first and second frames, (iv) filters the generated frames. In one embodiment, the system includes a server computer having an encoder, a client computer having a decoder, and a network connecting the server computer to the client computer. In this embodiment, the frame generator resides and executes within the client computer and receives the base frames from the decoder.

49 Claims, 22 Drawing Sheets

OTHER PUBLICATIONS

Haskell et al., "Motion Compensation Modes in MPEG", Digital Video: An Introduction to MPEG–2, Chapter 7, Kluwer Academic Publishers, XP002153352, 1997.

Copy of International Search Report, International Application No. PCT/US00/18390, Filing Date Jun. 30, 2000.

Kim, et al., "Local Motion–Adaptive Interpolation Technique Based on Block Matching;Algorithms", Signal Processing Image Communication, vol. 4, No. 6, Amsterdam, Nov. 1992.

Sallents, et al., "Simulation of a Teleconference Codec for ISDN", Proceedings of the European Signal Processing Conference, vol. 5, Amsterdam, Sep. 1990.

Blume, H., "New Algorithm for Nonlinear Vector–Based Upconversation with Center Weighted Medians", Journal of Electronic Imaging 6(3), pp. 368–378, Jul. 1997. (Search Report PCTUS00/18386).

Blume, H., "Nonlinear Vector Error Tolerant Interpolation of Intermediate Video Images by Weighted Medians", Signal Processing Image Communication, vol. 14, pp. 851–868, 1999. (Search Report PCTUS00/18386.

Kim, et al., "Local Motion–Adaptive Interpolation Technique Based on Block Matching Algorithms", Signal Processing Image Communication, vol. 4, No. 6, Amsterdam, Nov. 1992.

Copy of International Search Report, International Application No. PCT/USOO/18386, Filing date Jun. 30, 2000.

Copy of International Search Report, International Application No. PCTUS00/18228, Filing date Jun. 30, 2000.

Kokaram, et al., "Detection and Removal of Impulsive Noise in Image Sequences", Proceedings of he Singapore International Conference on Image Processing, Sep. 1992, Singapore. (Search Report PCTUS00/18386).

Kronander, T., "Post and Pre–Processing in Coding of Image Sequences Using Filters with Motion Compensated History", International Conference on Acoustics, Speech, and Signal Processing, Apr. 1988, New York City. (search Report PCTUS00/18386).

Migliorati, et al., "Multistage Motion Estimation for Image Interpolation", Signal Processing Image Communication, vol. 7, pp. 187–199, 1995. (Search Report PCTUS00/18386).

Sato, et al., "Video OCR for Digital News Archive", IEEE International Workshop on Content–Based Access of Image and Video Database, XP002149702, pp. 52–60, 1998. (Search Report PCTUS00/18228).

Thomas, G., "A Comparison of Motion–Compensated Interlace–to–Progressive Conversion Methods", Signal Processing Image Communication, vol. 12, pp. 209–229, 1998. (Search Report PCTUS00/18386).

Kiranyaz, et al., "Motion Compensated Frame Interpolation Techniques for VLBR Video Coding" Proceedings of ICIP (International Conference on Image Processing), 1997.

Han, et al., "Frame–rate Up–conversion Using Transmitted Motion and Segmentation Fields for Very Low Bit–rate Video Coding" Proceedings for ICIP (International Conference on Image Processing), 1997, pp. 747–750.

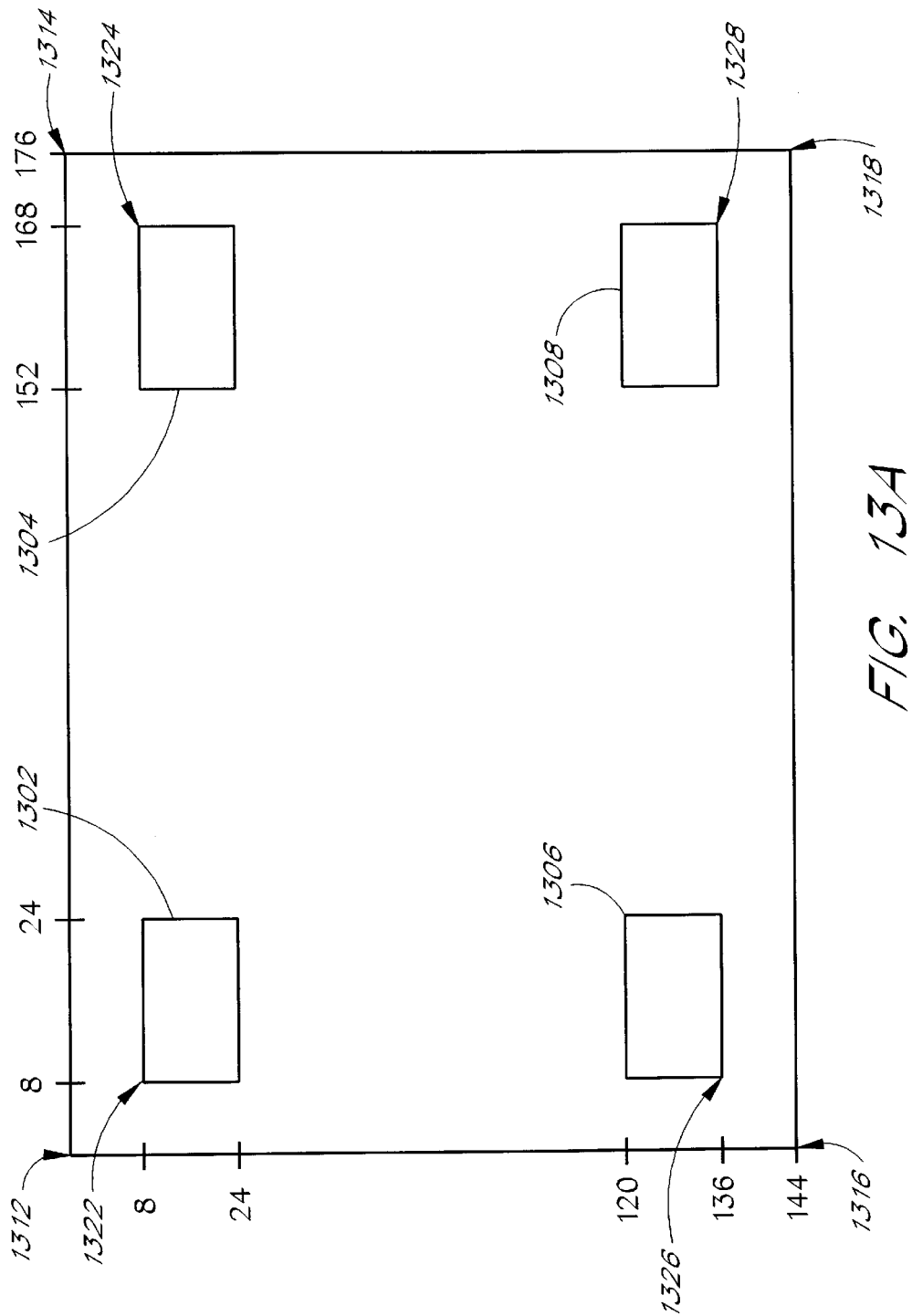

SYSTEM AND METHOD FOR GENERATING VIDEO FRAMES

RELATED APPLICATIONS

This application is related to and incorporates by reference in their entirety the following U.S. Patent Applications which were each filed concurrently herewith: application Ser. No. 09/345576, entitled "System and Method for Generating Video Frames and Detecting Text"; application Ser. No. 09/345584, entitled "System and Method for Generating Video Frames and Post Filtering"; and application Ser. No. 09/345577, entitled "System and Method for Generating Video Frames and Correcting Motion."

BACKGROUND OF THE INVENTION

1. Field of the Invention

The invention pertains to the field of video transmissions. More particularly, the invention pertains to a system and a method for generating video frames.

2. Description of the Related Art

Virtually all applications of video and visual communication deal with large quantities of video data. To create a video presentation, a rendering computer displays a plurality of digital images ("frames") in succession, thereby simulating movement. Currently, certain technical problems exist relating to transmitting and rendering a video presentation across low bandwidth computer networks. FIG. 1 illustrates a conventional streaming video system 100. In the video system 100, a media server 102 is connected via a network 104 to a rendering computer 106. The media server 102 typically includes one or more video presentations 110 for transmission to the rendering computer 106.

One problem that is encountered in current streaming systems is that the transmission bandwidth between the media server 102 and the rendering computer 106 is not sufficient to support a real-time seamless presentation, such as is provided by a standard television set. To overcome this problem and allow the user to receive the presentation in real-time, the video presentation is often spatially and temporally compressed. Further, to reduce the amount of data that is transmitted, the media server 102 skips selected frames of the presentation, or, alternatively, the video presentation can be developed having only a few frames per second. The resulting presentations, however, are jittery and strobe-like and are simply not as smooth as a presentation that has a higher frame rate.

To increase the rate at which the frames are displayed to a user, a frame generator 112 may be used to provide intermediate frames between two selected reference frames of the video presentation 110. Typically, frame generators fall within one of two categories: linear motion interpolation systems and motion compensated frame interpolation systems. Linear motion interpolation systems superimpose two reference frames of the video presentation 110 to create one or more intermediate frames. Motion compensated frame interpolation systems use motion vectors for frame interpolation.

FIG. 2 illustrates the data format of a frame 200 according to one motion compensated frame interpolation system. The frame 200 of FIG. 2 is divided into nine horizontal groups of blocks (GOB). Each GOB includes eleven macroblocks. Each macroblock has four luminance blocks of 8 pixels by 8 lines followed by two downsampled chrominance blocks (Cb and Cr).

In motion compensated interpolation systems, selected macroblocks are assigned a motion vector based upon a reference frame. FIG. 3 illustrates an exemplary reference frame 300. Usually, the reference frame is the last frame that was transmitted to the rendering computer 106. Each motion vector points to an equivalently sized region in the reference frame that is a good match for the macroblock that is to be transmitted. If a good representation cannot be found, the block is independently coded.

By sending motion vectors that point to regions in the reference frame already transmitted to the rendering computer 106, the media server 102 can transmit a representation of a frame using less data than if the pixel information for each pixel in each block is transmitted.

Although current frame generators increase the frame rate, they are simplistic in design. These systems do not account for certain idiosyncrasies within selected streaming presentations. For example, current frame generators that use motion compensated frame interpolation do not account for video presentations that have textual characters. Often a video image is overlaid with video text to convey additional information to the viewer. If motion compensated frame interpolation generates an intermediate frame having textual characters, the generated frame may inappropriately move the text to a new position, thereby creating some floating text that was not intended by the creator of the video presentation.

Another problem associated with existing frame generators is that they unintelligently perform frame generation regardless of whether such interpolation results in a better quality video presentation. Although frame interpolation does increase the number of frames presented to the viewer, such frame generation can produce strange results under certain circumstances. Some encoders, for example, choose a motion vector for a selected block based only upon the fact that the motion vector references a block that is a good match for the selected block even though there is no actual motion from one corresponding frame to the other. Thus, since all of the vectors do not represent motion, frame generation in these instances should not always be employed.

Additionally, current frame generators do not perform any type of post filtering to the generated frames. As can be readily appreciated, since motion compensated interpolation systems build an intermediate frame using blocks of pixels, i.e., macroblocks, the pixels at the border of each block may not be a close match to the pixels in the neighboring block. Accordingly, the borders of each of the blocks may be readily visible to a viewer of the media presentation. There is a need for a frame generator that behaves intelligently about the frame generation process. If frame generation would produce anomalous results, frame generation should not be performed. A frame generator should also determine whether the reference frames include textual characters and account for them in the frame generation process. A frame generator should also filter interpolation artifacts from the intermediate frame.

SUMMARY OF THE INVENTION

The frame generator of the present invention has several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Invention" one will understand how the features of this invention provide advantages over other frame generators.

One embodiment of the invention includes in a computer system, a method of generating video frames, the method comprising receiving a first frame in a memory in the computer system, receiving a second frame in the memory in the computer system, and determining whether to generate an intermediate frame between the first frame and the second frame, and generating, depending on the step of determining, at least one intermediate frame based on elements of the first frame and/or the second frame.

Another embodiment of the invention includes a system for generating video frames, the system comprising means for receiving a first frame in a memory in the computer system, means for receiving a second frame in the memory in the computer system, means for determining whether to generate an intermediate frame between the first frame and the second frame, and means for generating, depending on the step of determining, at least one intermediate frame based upon elements of the first frame and the second frame.

Yet another embodiment of the invention includes a method of generating frames, the method comprising receiving a first frame having a set of elements, the elements collectively defining a digital image, determining whether to perform frame generation, and generating a second frame using the set of elements from the first frame, the second frame representative of the first frame at a point in time either before or after the first frame.

Yet another embodiment of the invention includes a method of generating video frames, the method comprising receiving a first frame having a plurality of macroblocks in a memory in the computer system, the first frame representative of a video image at a first instance in time, each macroblock having a plurality of rows and columns of pixels, each of the pixels having an associated intensity value, receiving a second frame having a plurality of macroblocks in the memory in the computer system, the second frame representative of a video image at a second instance in time, each macroblock having a plurality of rows and columns of pixels, each of the pixels having an associated intensity value, and determining whether to generate an intermediate frame between the first frame and the second frame, the determining comprising the steps of: receiving time interval data indicative of the presentation timing of the first frame and the second frame, and determining whether the difference in time between the first frame and the second frame is greater than a threshold wherein the magnitude of the threshold is based, at least in part, on the value of a quantizer, and generating, depending on the step of determining, at least one intermediate frame based upon the macroblocks of the first frame and the second frame.

Yet another embodiment of the invention includes a system for generating video frames, the system comprising: a frame analysis module for receiving frames; and a frame synthesis module for determining whether the generation of one or more frames between two received frames provides for a smoother visual presentation than without the frame generation.

Yet another embodiment of the invention includes a method of generating video frames, the method comprising: receiving a first frame in a memory in the computer system, the first frame comprising a first set of elements, receiving a second frame in the memory in the computer system, the second frame comprising a second set of elements, and selecting a frame generation method based upon information in the first frame and/or the second frame, and applying the selected frame generation method to generate at least one intermediate frame based upon the first set of elements and/or the second set of elements.

Yet another embodiment of the invention includes a system for generating video frames, the system comprising: means for receiving a first frame in a memory in the computer system, the first frame comprising a first set of elements, means for receiving a second frame in the memory in the computer system, the second frame comprising a second set of elements, means for selecting a frame generation method based upon the first frame and/or the second frame, and means for applying the selected frame generation method to generate at least one intermediate frame based upon the first set of elements and/or the second set of elements.

Yet another embodiment of the invention includes a system for generating video frames, the system comprising a frame analysis module for receiving frames, and a frame synthesis module for determining whether the generation of one or more frames between the received frames provides for a smoother visual presentation than without the frame generation.

BRIEF DESCRIPTION OF THE DRAWINGS

FIG. 13A is a flowchart illustrating four blocks of the second frame that are analyzed as apart of the global motion correction process of FIG. 12.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout.

System Overview

Figure 1:
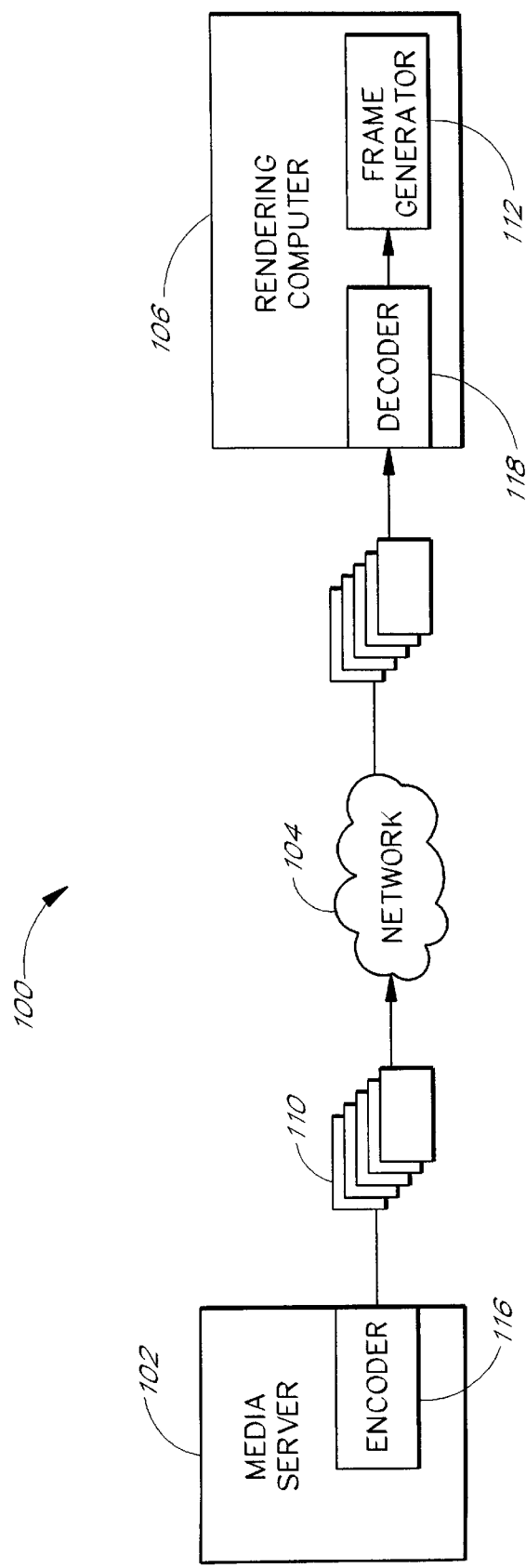
FIG. 1 is a high-level block diagram of a streaming video system having a media server and at least one rendering computer.
Figure 2:
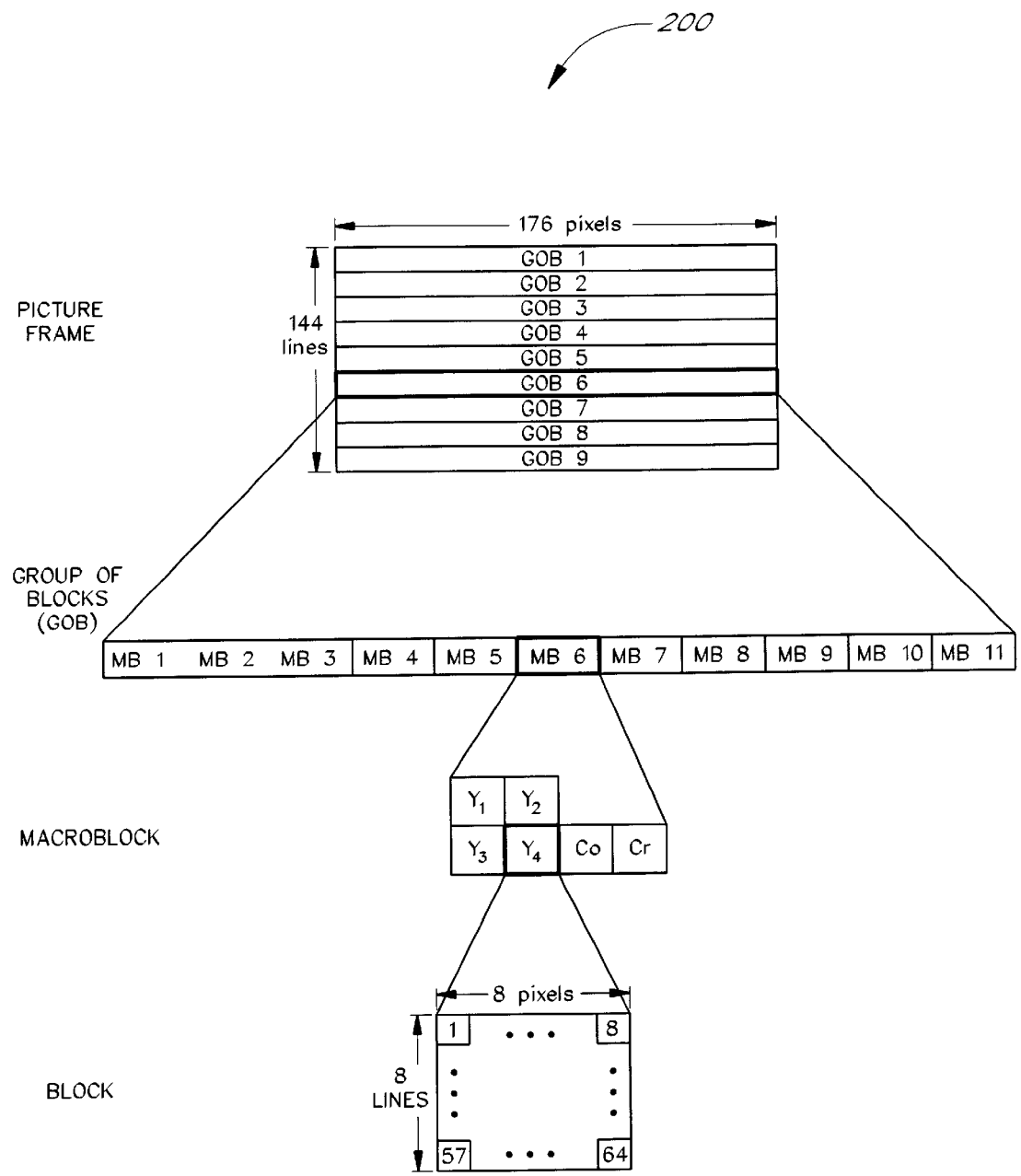
FIG. 2 is a diagram illustrating the composition of a video frame that may be used in a streaming video presentation.
Figure 3:
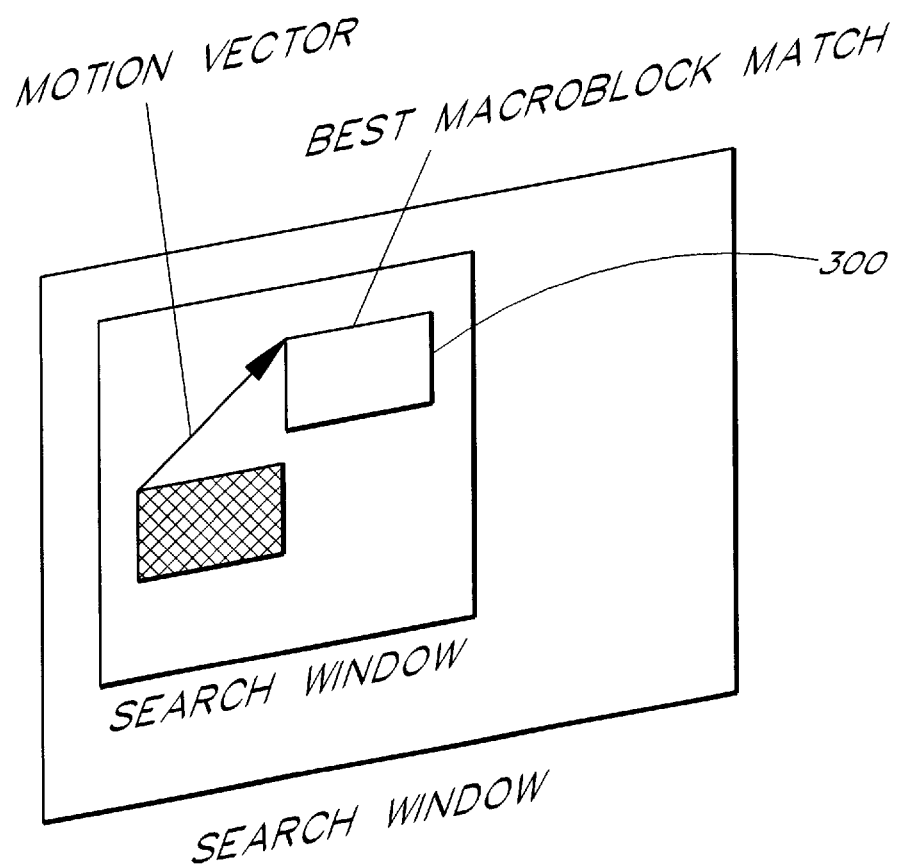
FIG. 3 is a block diagram illustrating a motion vector based encoding scheme that may be used in the media server of FIG. 1.

FIG. 1 illustrates a high-level block diagram of a streaming video system 100 that can be used with an embodiment of the present invention. The streaming video system 100 includes a media server 102 connected to a rendering computer 106 via a network 104.

It is noted that the media server 102 and the rendering computer 106 may each be any conventional general purpose computer using one or more microprocessors, such as a Pentium processor, a Pentium II processor, a Pentium Pro processor, an xx86 processor, an 8051 processor, a MIPS processor, a Power PC processor, or an ALPHA processor.

The media server 102 includes an encoder 116 for encoding video images. The rendering computer 106 includes a decoder 118 for decoding the video images that have been encoded by the encoder 116 and subsequently transmitted to the rendering computer 106. For convenience of description, the following description will describe the use of an encoder and decoder that are configured to meet the H.263 and/or the H.263(+) Version 2 standards. However, the processes of the present invention may used with other standard encoding and decoding schemes, such as, for example, H.261, MPEG-1, and MPEG-2. Further, a proprietary encoding and decoding scheme may be used.

A frame generator 112 receives from the decoder 118 two frames at a time, each of the frames respectively acting as a first base frame and a second base frame which may be used for the interpolation of one or more intermediate frames.

The frame generator 112, as part of the frame generation process, uses and/or calculates a number of thresholds, each of which are discussed below. Each of the values of these thresholds has been derived analytically and using heuristical testing. Accordingly, each of the values can vary depending on the transmission rate of the network 104, the processing speed of the media server 102 and the rendering computer 106, and the encoding and decoding algorithms that are respectively employed by the encoder 116 and the decoder 118.

Figure 4:
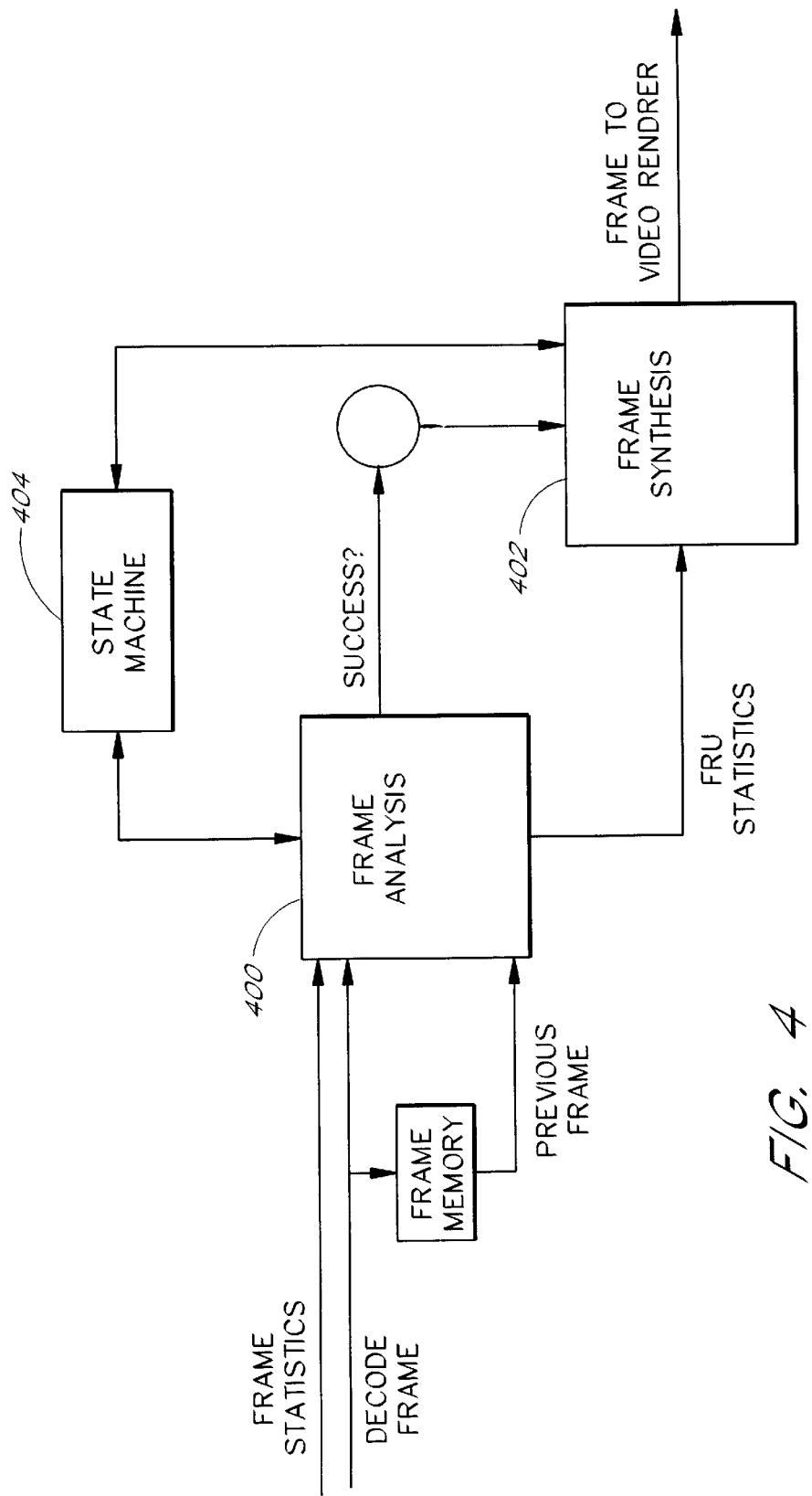
FIG. 4 is a block diagram illustrating the components of the frame generator of the present invention.

FIG. 4 illustrates components of the frame generator 112 in accordance with one embodiment of the present invention. The frame generator 112 includes a frame analysis module 400 and a frame synthesis module 402. In one embodiment, the frame analysis module 400 and the frame synthesis module 402 each consist of various software modules that are typically separately compiled and linked into a single executable program. Accordingly, the frame analysis module 400 and the frame synthesis module 402 may be optionally integrated into one or more software modules that reside and execute on the rendering system 106.

In one embodiment, the frame generator 112 operates using a state machine 404. In one embodiment the state machine 404 is a software module, similar in kind to the frame analysis module and/or the frame synthesis module 402. The state machine 404 is operably connected to the frame analysis module 400 and the frame synthesis module 402. In one embodiment of the invention, the state machine 404 has seven states, including: KEYFRAME, ABORT, LOW_ACTION, MODERATE_ACTION, HIGH_ACTION, BIG_CHANGE, and SMALL_CHANGE. However, as can be readily appreciated by one of ordinary skill in the art, a simpler or a more complex state machine can be employed.

The frame generator 112 uses one or more states of the state machine 404 to determine which actions need be performed during frame analysis and frame generation. Table 1 provides a brief description of each of the states.

TABLE 1

| State | State Description |
|---|---|
| KEYFRAME | The second frame is independently coded. |
| ABORT | Frame generation should not proceed. |
| LOW_ACTION | The motion vectors of the second base frame are below a selected threshold. |
| MODERATE_ACTION | Moderate action is detected between the first and second base frames |
| HIGH_ACTION | Significant action is detected between the first and second base frames. |
| SMALL_CHANGE | Minor differences are identified between the first and second base frames. |
| BIG_CHANGE | Significant differences are identified between the first and second base frames. |

The significance of each of the states of the state machine 404 in relation to the frame generation process will be discussed in further detail below.

Referring again to FIG. 4, the frame analysis module 400, the frame synthesis module 402, and the state machine 404 may be each written in any programming language such as C, C++, BASIC, Pascal, JAVA, and FORTRAN. C, C++, BASIC, Pascal, JAVA, and FORTRAN are industry standard programming languages for which many commercial compilers can be used to create executable code. Further, the foregoing components of the frame generator 112 may be used in connection with various operating systems such as: UNIX, Solaris, Disk Operating System (DOS), OS/2, Windows 3.X, Windows 95, Windows 98, and Windows NT.

Alternatively, the frame analysis module 400, the frame synthesis module 402, and/or the state machine 404 may each be implemented as a hardware device.

System Operation

Figure 5:
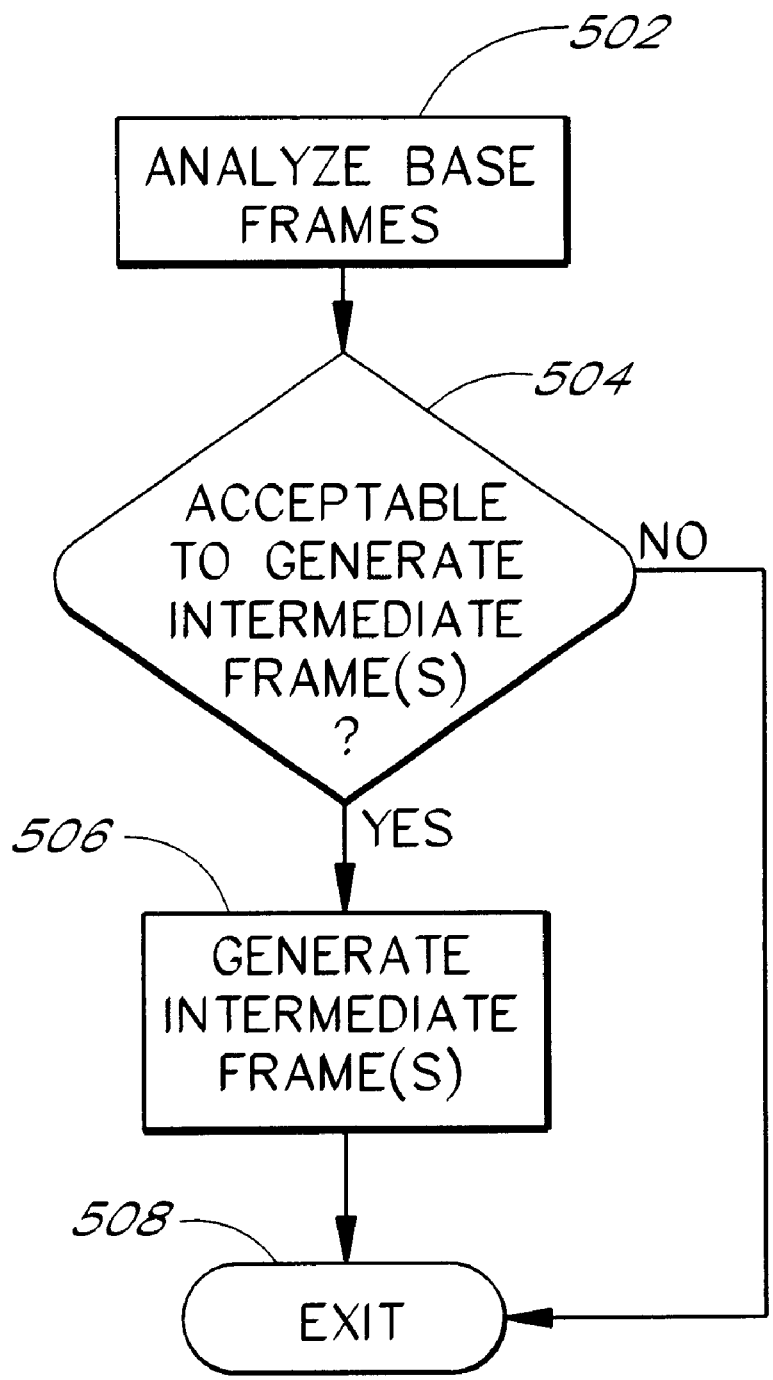
FIG. 5 is a high level flowchart illustrating the frame generation process of the frame generator of FIG. 4, the process comprising: analyzing two base frames, determining whether frame generation should occur based upon the two base frames, and generating one or more intermediate frames.

FIG. 5 is a high-level flowchart illustrating the frame generation process of the frame generator 112 (FIG. 1). Before starting, the frame generator 112 has received at least a first and second base frame from the decoder 118. Further, the decoder 118 has provided the frame generator 112 various items of statistical information. Starting at a step 502, the frame generator 112 analyzes the first and second base frames and the statistical information. The process for analyzing the base frames is described below with reference to FIGS. 6–21. It is noted that, as used herein, the term "frame generation" is intended to include frame interpolation.

Next, at a decision step 504, the frame generator 112 (FIG. 1) determines whether to generate an intermediate frame, based upon the first and second base frames and the statistical information. The process for determining whether to generate an intermediate frame is described below with reference to FIGS. 6–20. However, in brief, some of the factors that the frame generator 112 considers when determining whether to perform frame generation include: the presence of textual characters, the size of the motions vectors that are associated with the base frames, the number of macroblocks that have been independently coded in the base frames, the duration of times between the base frames, whether the motion vectors that are associated with each of the macroblocks in the base frames can be corrected, and comparison information regarding the vectors of each of the macroblocks in the base frames.

If the frame generator 112 determines it is acceptable to generate intermediate frames, the frame generator 112 proceeds to the step 506. At the step 506, the frame generator 112, depending on the implementation, generates one or more intermediate frames. The process for generating intermediate frames is described in further detail below with reference to FIG. 21. At the step 506, the frame generator 112 may also filter the generated frames. The process for filtering the generated frames is described below with reference to FIG. 22.

Referring again to the decision step 504, if the frame generator 112 (FIG. 1) determines that it is not acceptable to generate intermediate frames, the process ends at the step 508.

State Determination

FIGS. 6–10, in combination, are a flowchart illustrating a state determination process. The frame generator 112 uses the state to determine whether frame generation is appropriate and also to select an appropriate frame generation method. FIGS. 6–10 illustrate in further detail the steps that are performed in step 502 of FIG. 5.

Starting at a step 600, the decoder 118 (FIG. 1) sends a first base frame, a second base frame, and statistical information regarding the first and second base frames to the frame generator 112 (FIG. 1). The frame generator 112 in subsequent steps will analyze each of these two base frames as part of the process of generating an intermediate frame. After the frame generator 112 (FIG. 1) has completed its analysis regarding the first and second base frames, the next two base frames that are provided to the frame generator 112 will include the second base frame and a new base frame, the second base frame being a replacement of the first base frame. Thus, each base frame in the video presentation 110 (FIG. 1) is passed at least twice to the frame generator 112, once as a first base frame, and once a second base frame. It is also noted that in a preferred embodiment, no frame generation is performed until the frame generator 112 receives data representing at least two frames from the decoder 118.

In an embodiment of the invention using the H.263 standard, the statistical information that is transmitted from the decoder 118 (FIG. 1) may include the following information. First, the statistical information includes an indicator as to whether the second base frame was independently coded. According to the H.263 standard, a frame can be independently coded or dependently coded. If a frame is independently coded, each macroblock of the frame is transmitted from the media server 102 to the rendering computer 106. If the frame is dependently coded, a motion vector associated with each of the dependently coded macroblocks is sent to the rendering computer 106. Each of the motion vectors identify regions in a previously sent frame. Second, the statistical information includes a quantizer for the second base frame. The quantizer is an integer ranging from 1 to 31 that identifies the clarity of the second base frame. Generally, the lower the value of the quantizer, the higher is the clarity of the second base frame. Third, the statistical information includes the time in milliseconds between the first base frame and the second base frame. Also, the statistical information may include the macroblock information for the first and second base frames. The macroblock information includes for each macroblock, at least one of two items: (i) if the macroblock was dependently coded, an associated motion vector, or (ii) if the macroblock was independently coded, statistical information regarding the macroblock.

At a next step 602, the frame generator 112 (FIG. 1) performs various error checking routines on the first and second base frames to determine whether the base frames contain valid information. If the first and second base frames are not valid, the frame generator 112 aborts the frame generation process. Otherwise, if the first and second base frames are valid, the frame generator 112 continues to a step 604 to determine whether the second base frame is independently coded or was coded using motion vectors.

If the second base frame was independently coded, the frame generator 112 (FIG. 1) proceeds to a step 610 and assigns the state of the frame generator 112 to "KEY-FRAME." Continuing to a decision step 612, the frame generator 112 determines whether the time interval, identified by the statistical information, between the two base frames is greater than a first threshold. In one embodiment of the invention, the first threshold is about 67 milliseconds. 67 milliseconds represents the time that is between two base frames that are presented at a rate of 15 frames per second. It will be appreciated by those of ordinary skill in the art that the threshold may change from implementation to implementation.

If the time between the first and second base frames is greater than the first threshold, the frame generator 112 (FIG. 1) proceeds to a step 614. At a step 614, the frame generator 112 makes the state equal to "BIG_CHANGE" due to the relatively large time interval between the two base frames. As was discussed above, the state "BIG_CHANGE" indicates that there may be significant differences between the images in the first and second base frames. Next, at the exit step 616, the frame generator 112 finishes its preliminary frame analysis.

Referring again to the decision step 612, if the frame generator 112 (FIG. 1) determines that the time between to the two base frames is less than the first threshold, the frame generator 112 maintains the state equal to "KEYFRAME." Further, the frame generator 112 proceeds to the exit step 616 and finishes the state determination process.

Now, referring again to the decision step 604 (FIG. 6), if the frame generator 112 (FIG. 1) determines that the second base frame is not independently coded, the frame generator 112 proceeds to a decision step 618. At the decision step 618, the frame generator 112 determines whether the duration of time between the first base frame and second base frame is greater than a second threshold. The frame generator 112 assumes that if there is a large interval between the base frames, there is likely to be a big change in the images of each of base frames. Further, as was discussed above, if the value of the quantizer is high, the image in a frame will have less clarity than a frame having a lower quantizer. Thus, any changes in a frame having a low quantizer are more readily noticeable than in a frame having a lower quantizer. In one embodiment of the invention, the second threshold is equal to the value of the quantizer multiplied by twenty (20). The value of twenty has been obtained by various heuristics and analysis and provides, in one embodiment, a desirable threshold when used in connection with the quantizer.

If the duration between the first base frame and second base frame is greater than the second threshold, the frame generator 112 (FIG. 1) proceeds to the step 614 and assigns the state in the state machine 404 (FIG. 4) to be "BIG_CHANGE." Otherwise, if the duration between the first base frame and the second base frame is less than the value of the second threshold, the frame generator 112 proceeds to a step 622 and counts the number of blocks in the second base frame that are independently coded.

Next, at a decision step 624, the frame generator 112 (FIG. 1) determines whether the percentage of blocks that were counted in the step 622 is greater than a third threshold. In one embodiment of the invention, the third threshold is about 6⅔% of the number of macroblocks in the second frame. As can be readily appreciated by one of ordinary skill, macroblocks are usually independently coded when the encoder 116 (FIG. 1) cannot find a good match between the macroblock and a equivalently sized region in a selected one or more of the previous frames. As the number of independently macroblocks increases, the frame generator 112 assumes that there is a higher likelihood that there is a large change between the first and second base frames and that frame generation may be inappropriate.

If the number of macroblocks in the second base frame that have been independently coded is greater than the third threshold, the frame generator 112 proceeds to the step 614. Otherwise, if the number of macroblocks in the second frame that have been independently coded is less than the third threshold, the frame generator 112 proceeds to a decision step 626.

At a decision step 626, the frame generator 112 (FIG. 1) determines whether the maximum motion vector in the second frame is less than a fourth threshold. In one embodiment of the invention, the frame generator 112 determines the maximum motion vector as follows. First, a scalar is determined for each motion vector. The scalar is equal to the sum of the square of each of the x and the y components of a motion vector. Second, the scalar having the highest value is selected.

In one embodiment of the invention, the value of the fourth threshold depends on the value of the quantizer for the second frame. The frame generator 112 uses the quantizer to determine whether any of the motion vectors in the second frame is relatively large in relation to the quantizer. Table 2 illustrates the values of the fourth threshold depending on the value of the quantizer.

TABLE 2

| Quantizer Value | Fourth Threshold |
|---|---|
| quantizer < 5 | 6 |
| 5 ≧ quantizer < 11 | 12 |
| quantizer ≧ 12 | 24 |

If the scalar associated with the maximum motion vector is less than the fourth threshold, the frame generator 112 proceeds to a step 630. At a step 630, the frame generator 112 assigns the state in the state machine 404 (FIG. 4) to be "LOW_ACTION." Continuing to the step 616, the frame generator 112 has completed its preliminary state determination process.

Referring again to the step decision step 626, if the frame generator 112 (FIG. 1) determines that the maximum motion vector is greater than the fourth threshold, the frame generator 112 proceeds to a step 632. At the step 632, the frame generator 112, calculates, for each macroblock in the second frame: (i) the average distance between the motion vector associated with a respective macroblock and the motion vector associated with the macroblock to the right of the respective macroblock; and (ii) the average distance between the motion vector associated with the respective macroblock and the motion vector associated with the macroblock below the respective macroblock. In one embodiment, the distance between two motion vectors is calculated by taking the absolute value of the difference between the x components and the y components of each of the two motion vectors.

Figure 9:
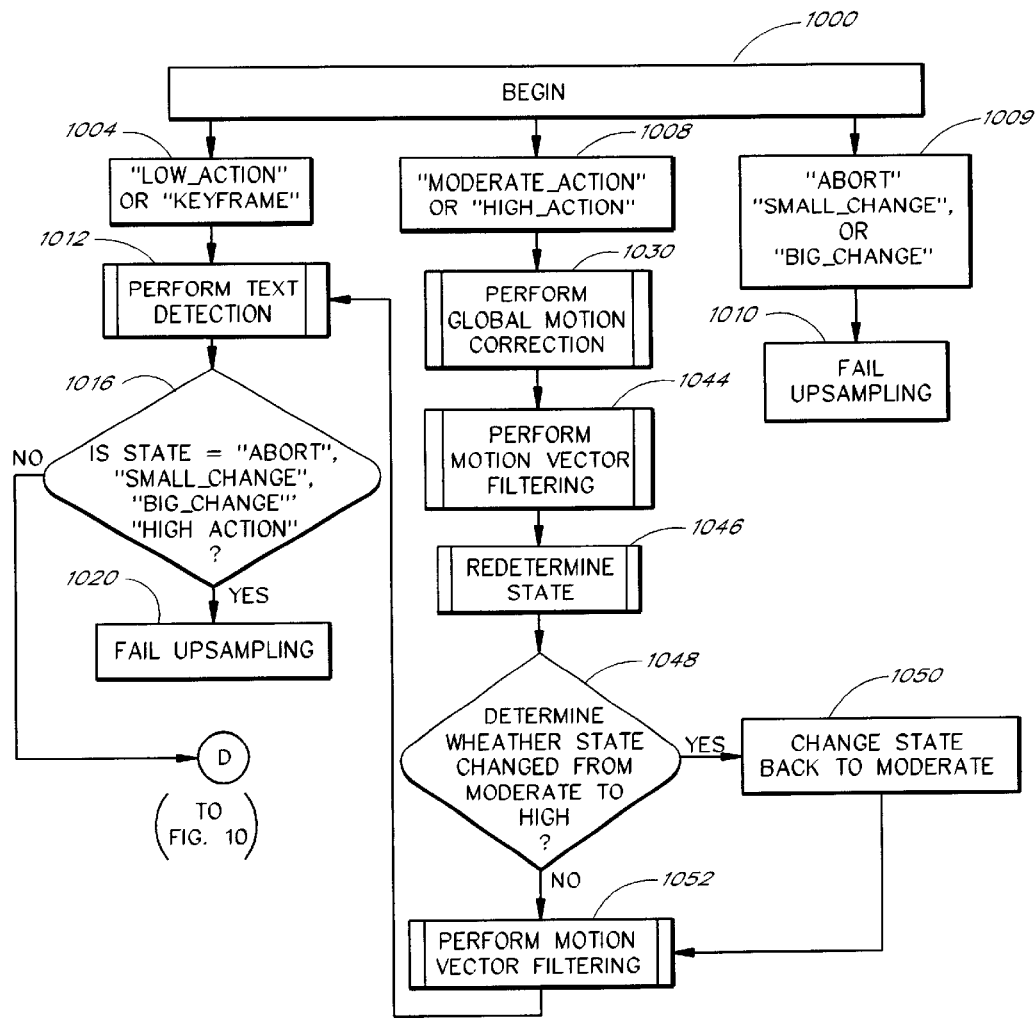
Figure 11:
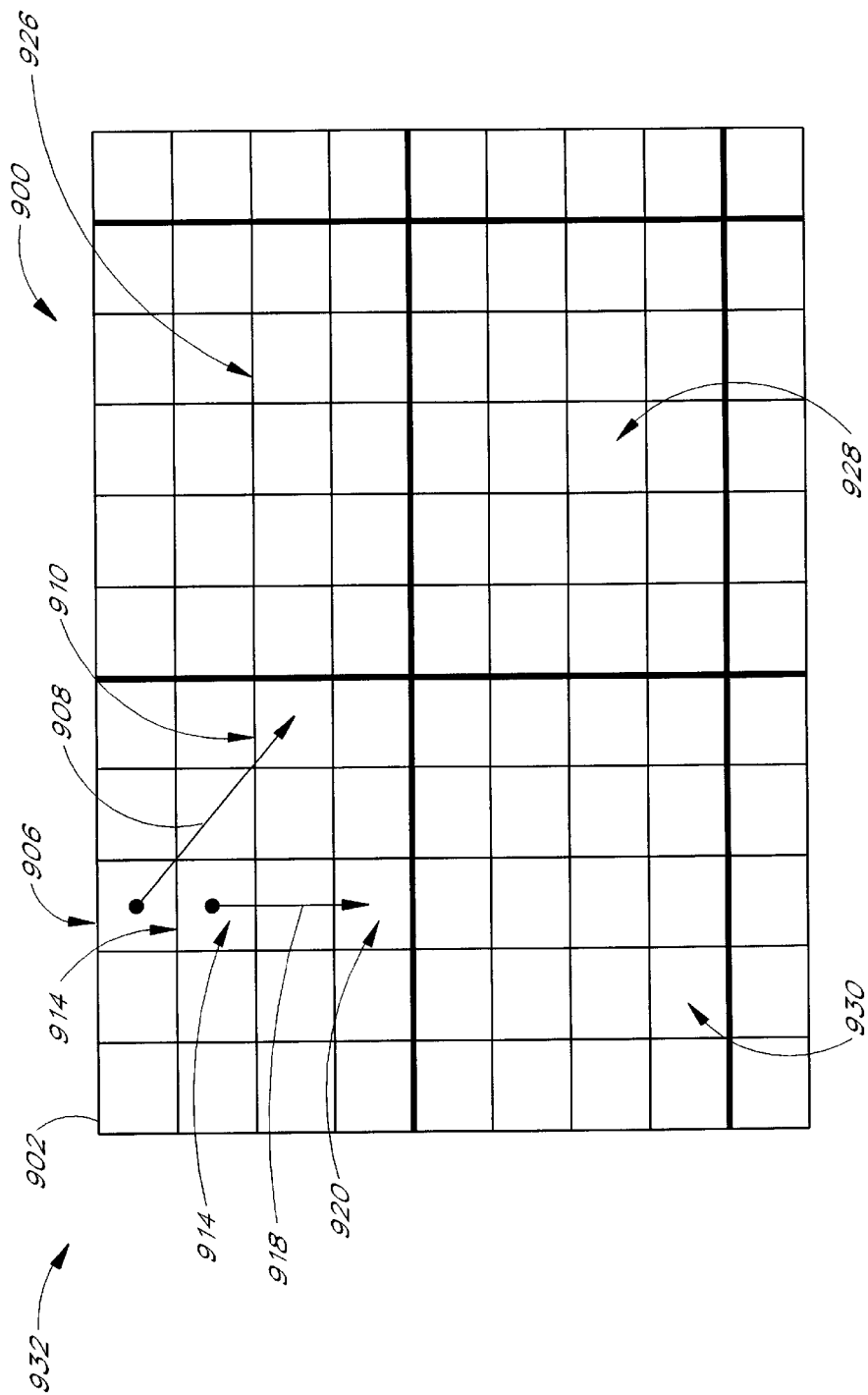
FIG. 11 is a representational diagram illustrating the layout of an exemplary base frame.

For example, FIG. 11 illustrates an exemplary frame 900 having a plurality of macroblocks 902. The frame 900 is the second of two base frames that has been sent to the frame generator 112 (FIG. 1) by the decoder 118 (FIG. 1). A macroblock 906 in a first spatial position as shown in FIG. 9, has an associated motion vector 908 that references a region in a previous base frame having the same spatial positioning as macroblock 910. In this example, the value of the x component of the motion vector 908 is 2, and the value of the y component of the motion vector 908 is −2. As another example, a macroblock 914 has an associated motion vector 918 that references a region in a previous base frame, such as the first base frame, having the same spatial positioning as the macroblock 920. The value of the x component of the motion vector 918 is 0, and the value of the y component of the motion vector 918 is −2.

Continuing the example, to calculate the difference between the motion vector 908 and the motion vector 918, the following calculations are performed. First, the absolute value of the differences in the x components of each vector is determined, i.e., 2−0=2. Second, the absolute value of the differences in the y components of each component is determined, i.e., 2−2=0.

Figure 6:
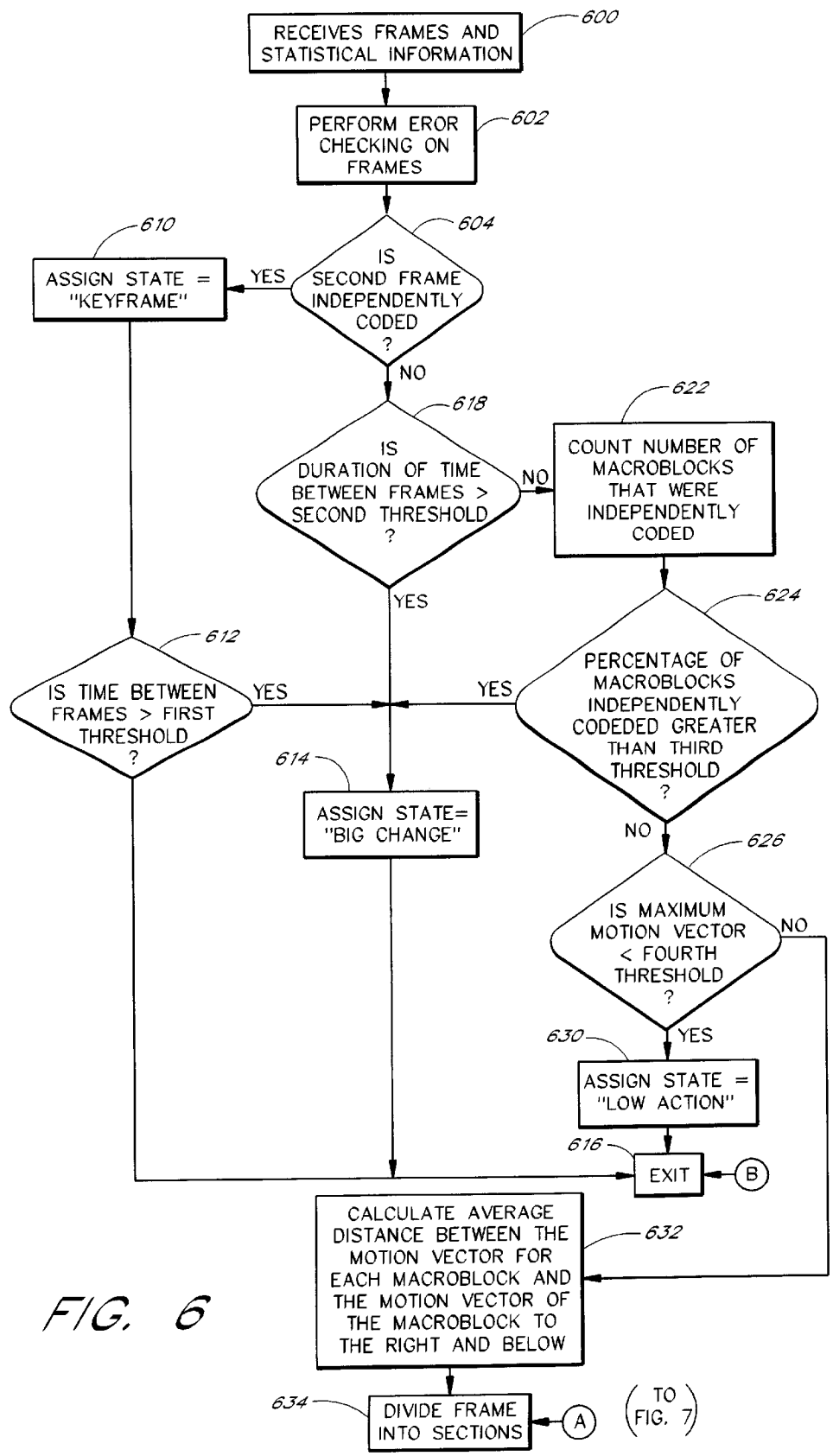
FIGS. 6–10 are collectively a flowchart illustrating the steps that occur in FIG. 5 in regard to analyzing the two base frames and determining whether frame generation should occur.

Next, at a step 634 of FIG. 6, the frame generator 112 (FIG. 1) divides the second frame into sections. In one embodiment of the invention, the second base frame is roughly divided into four quadrants 926, 928, 930, 932 (FIG. 11). In one embodiment of the invention, the right-most column and the bottom-most row of macroblocks are not included in any of the sections.

Figure 7:
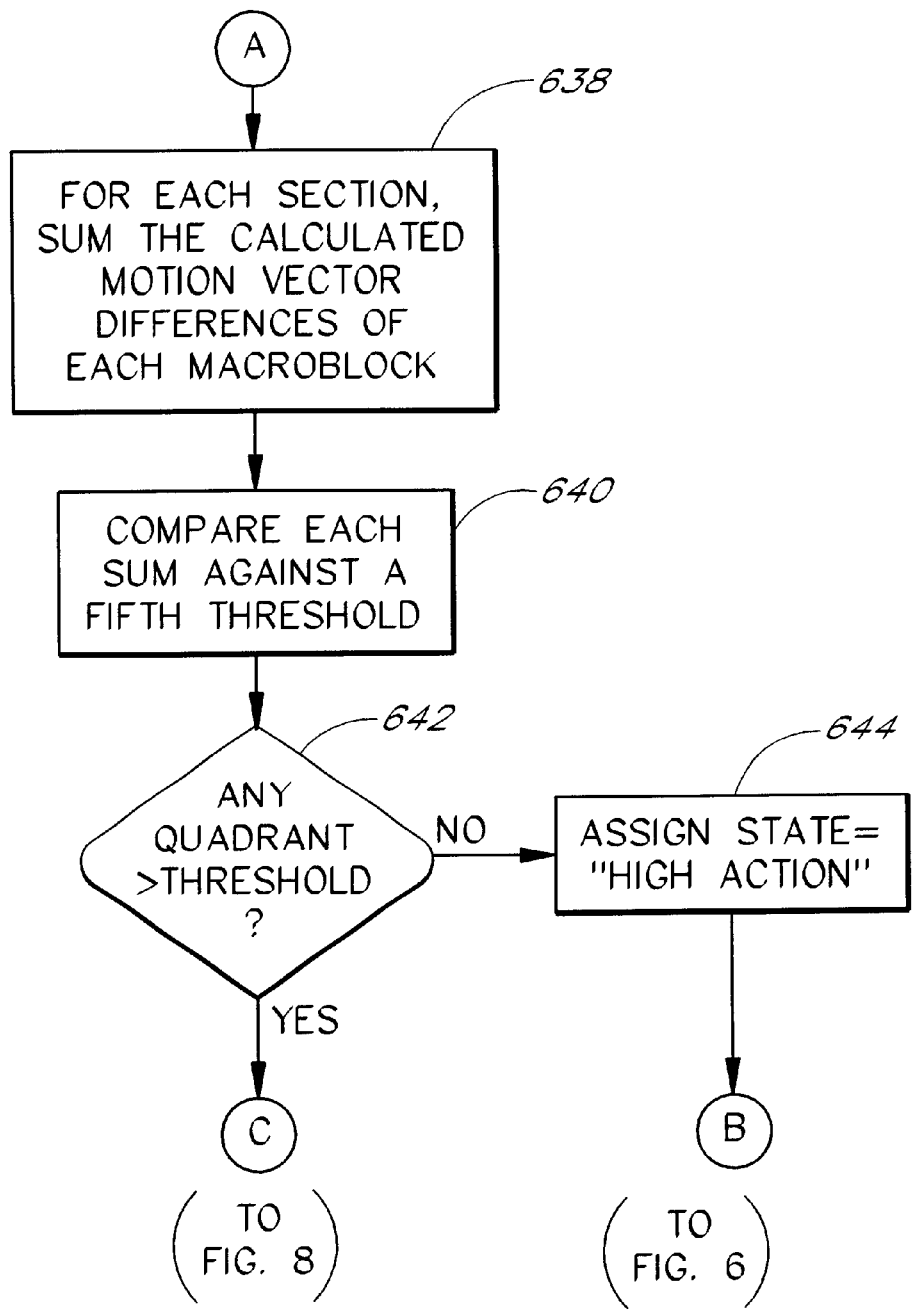
Figure 8:
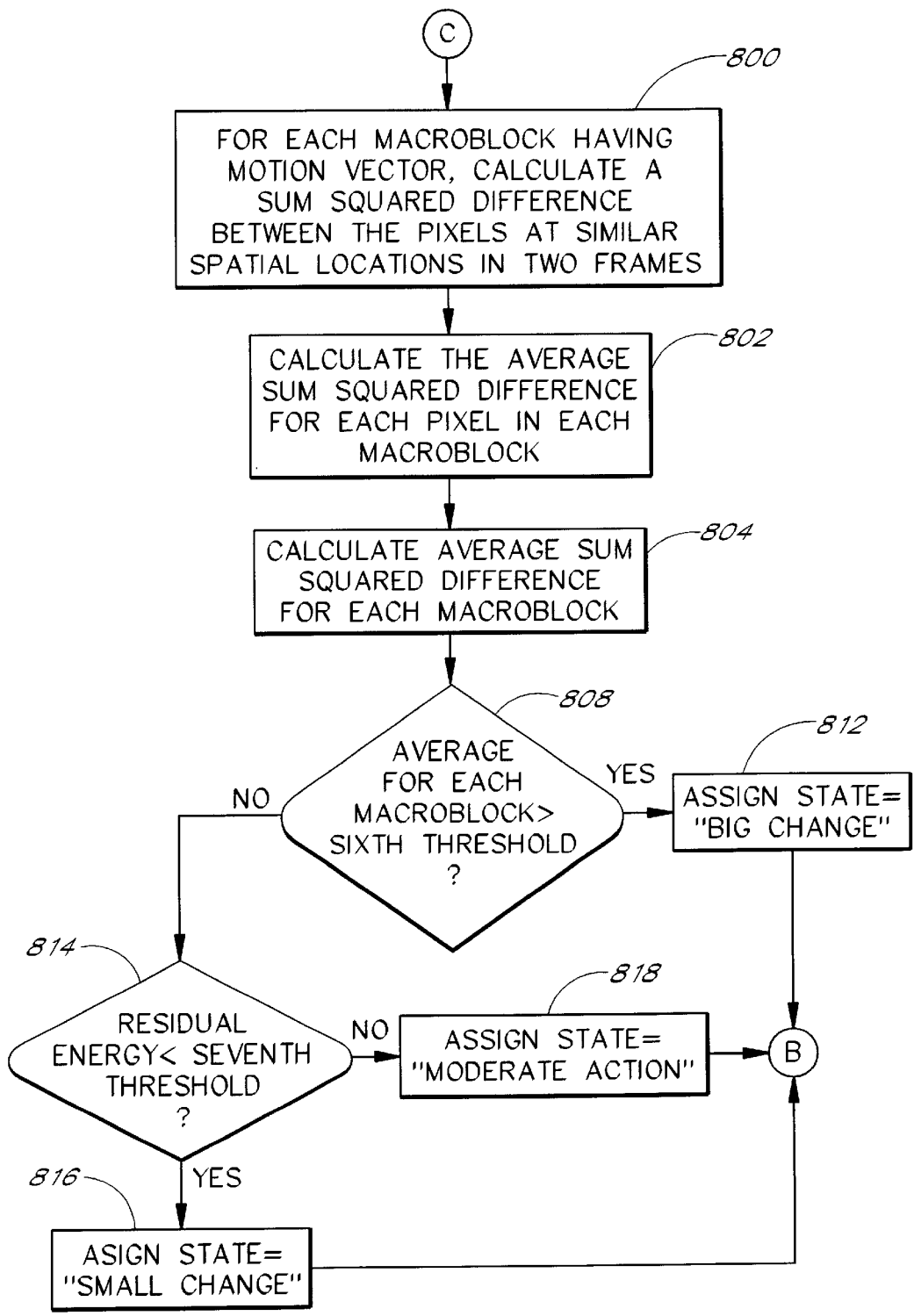

Once the frames are divided into sections, the frame generator 112 (FIG. 1) proceeds to a step 638 (FIG. 7). At the step 638, the frame generator 112, for each of the sections, sums the calculated motion vector differences (determined in the step 632) for the macroblocks within a respective section, ie., the sum of the differences for each of the x and y components between each of the macroblocks and the macroblock's neighbors to the right and below.

Proceeding to a step 640 (FIG. 7), the frame generator 112 compares each of the sums associated with each of the sections (determined in the step 632) against a fifth threshold. In one embodiment of the invention, the fifth threshold is set to equal about 64. It is noted that the value of 64 has been determined using various heuristical analysis and testing techniques.

Continuing to a step 642, if any of the sums exceeds the fifth threshold, the frame generator 112 proceeds to a step 644 and assigns the state in the state machine 404 (FIG. 4) to be "HIGH_ACTION." Proceeding to the step 616 (FIG. 6) via off-page-connector "B", the frame generator 112 exits the state determination process.

Referring again to the step 642 (FIG. 7), if none of the sums associated with any of the sections exceed the threshold, the frame generator 112 (FIG. 1) proceeds to a step 800 (FIG. 8) via off-page-connector "C." At a step 800, the frame generator 112 calculates a sum squared difference between the pixel intensity of each of the pixels in the second base frame with respect to pixels in the first base frame.

For example, referring again to FIG. 9, the frame generator 112 compares the pixel intensity of each pixel in a macroblock 906 with the pixel intensity of pixels in a macroblock in the same spatial location in a previous base frame, such as the first base frame. In one embodiment of the present invention, each pixel in the macroblock is represented by an integer ranging from 0 to 255, the integer identifying the "intensity" of each of the pixels, a value of 0 representing black, a value of 255 representing white, and intermediary values representing a relative mix of the two.

Proceeding to a step 802 (FIG. 8), the frame generator 112 (FIG. 1) uses the values calculated in the step 800 to calculate the average sum-squared difference in intensity levels between the pixels in each of the macroblocks. This average sum squared difference is calculated by summing the differences calculated in the step 802, and then dividing the sum by the number of pixels in the macroblock.

At a next step 804, the frame generator 112 calculates the average sum-squared difference of pixel intensity for each of the macroblocks. The average sum-squared difference is calculated by summing the average sum-squared difference for each macroblock (calculated in the step 802) and dividing the sum by the number of macroblocks.

Continuing to a decision step 808, the frame generator 112 determines whether the average sum-squared pixel intensity is greater than a sixth threshold. In one embodiment of the invention, the sixth threshold is calculated by Equation 1.

$$\text{sixth threshold} = \text{quantizer} * 4 * (133/\Delta)^2. \quad (1)$$

quantizer=Level of clarity of the second frame time.
Δ=Duration of time in milliseconds between the first base frame and the second base frame.

It is noted that the value of 133 corresponds to the time in milliseconds between two frames that are sent at a rate of 7.5 frames per second (a typical transmission rate for a 28.8 kbps communications device).

If the average sum-squared pixel intensity is greater than the sixth threshold, the frame generator 112 (FIG. 1) proceeds to a step 812 and assigns the state in the state machine 404 to be "BIG_CHANGE." Next, the process returns through the off-page connector "B" to the exit step 616 (FIG. 6), and the frame generator 112 completes its preliminary state determination process.

Referring again to the decision step 808 (FIG. 8), if the average is less than the sixth threshold, the frame generator 112 (FIG. 1) proceeds to a step 814. At the step 814, the frame generator 112 determines whether the sum-squared difference in pixel intensity between the pixels in first and second base frames is less than the seventh threshold. In one embodiment of the invention, the seventh threshold is set to about 2500, but it will be appreciated that other thresholds may be used, particularly for differing implementations.

If the sum-squared differences in pixel intensity is less than the seventh threshold, the frame generator 112 (FIG. 1) proceeds to a step 816. At the step 816, the frame generator 112 assigns the state in the state machine 404 to be "SMALL_CHANGE." Next, the frame generator 112 proceeds to the exit step 616 via off-the-page connector "B" and completes the state determination process.

Referring again to the decision step 814, if the frame generator 112 (FIG. 1) determines that the sum-squared difference in pixel intensity between the first and second frames is greater than or equal to the seventh threshold, the frame generator 112 proceeds to a step 818. At the step 818, the frame generator 112 assigns the state in the state machine 404 to be "MODERATE_ACTION." Next, the frame generator 112 proceeds to the exit step 616 via the off-page-connector "B" and completes the step determination process.

Frame Analysis

Figure 10:
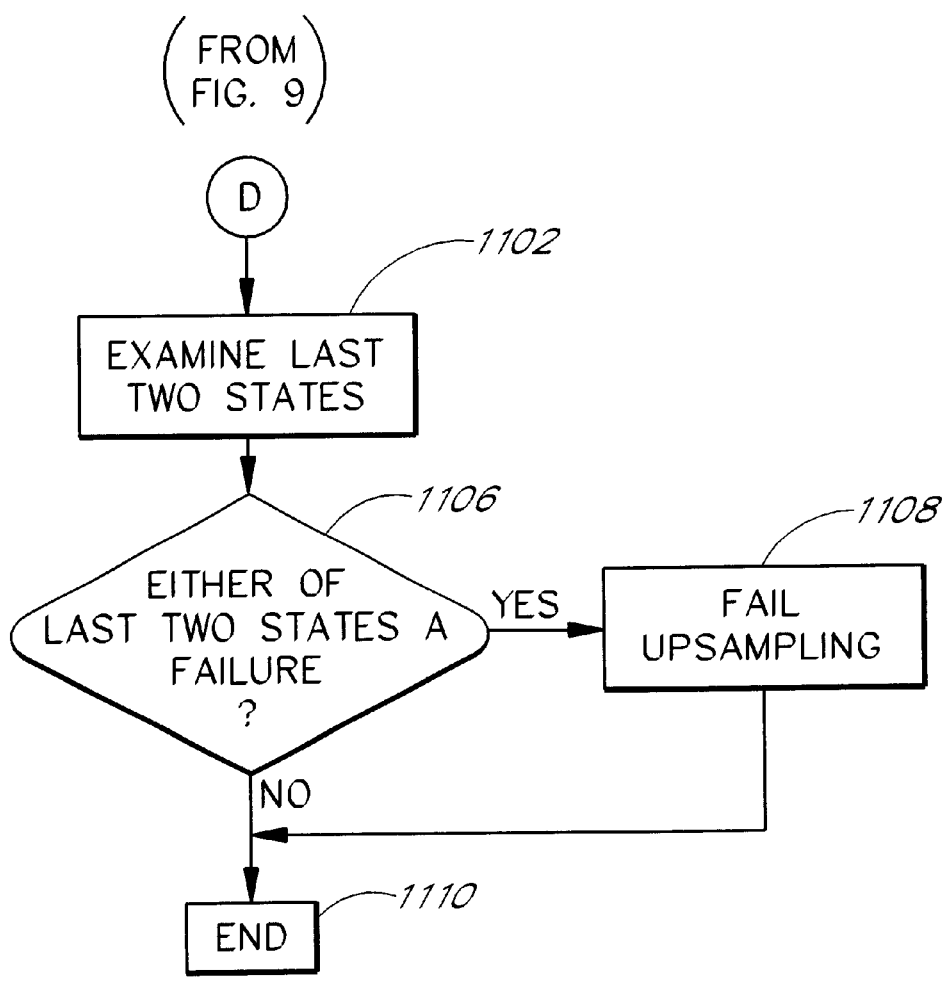

FIGS. 9 and 10 illustrate in combination a flowchart for performing additional analysis regarding the first and second base frames. In particular, FIGS. 9 and 10 illustrate a process for determining, depending on the value of the state maintained by the state machine 404, the appropriateness of generating intermediate frames between the first base frame and the second base frame. The frame generator 112 (FIG. 1) proceeds to a step 1000 (FIG. 9) from the exit step 616 (FIG. 6).

Depending on the state of the state machine 404, the frame generator 112 (FIG. 1) proceeds to either a step 1004, a step 1008, or a step 1009. If the state in the state machine 404 (FIG. 4) is either "LOW_ACTION" or "KEYFRAME", the frame generator 112 proceeds to the step 1004. From the step 1004, the frame generator 112 proceeds to a step 1012 to determine whether the frame generator 112 can detect text in the first and second base frames. The text detection process is described in further detail below with reference to FIG. 20.

Next, at a decision step 1016, the frame generator 112 (FIG. 1) determines whether the state in the state machine 404 (FIG. 4) is one of the states: "ABORT", "SMALL_CHANGE", "BIG_CHANGE", or "HIGH_ACTION." If the state is either "ABORT", "SMALL_CHANGE", "BIG_CHANGE", or "HIGH_ACTION", the frame generator 112 fails the frame generation and proceeds to a fail step 1020. At the fail step 1020, to assist in determining the appropriateness of frame generation in subsequent frames, the frame generator 112 records that the frame generation was not appropriate.

Referring again to the decision step 1016 (FIG. 9), if the state is in the state machine 404 (FIG. 4) is not is one of the states: "ABORT", "SMALL_CHANGE", "BIG_CHANGE", or "HIGH_ACTION", the frame generator 112 (FIG. 1) proceeds to a step 1102 (FIG. 10) via the off-page connector "D."

At the step 1102 (FIG. 10), the frame generator 112 examines the status of the state of the state machine 404 during the last two attempts at frame generation. As was discussed with reference to the fail step 1020, subsequent to processing the first and second base frames, the frame generator 112 records whether the frame generation was determined to be appropriate with respect to the two frames.

Continuing to a decision step 1106, if the frame generator 112 (FIG. 1) determines that frame generation was determined to be inappropriate in one of the last two attempts at frame generation, the frame generator 112 proceeds to a step 1108 and fails the frame generation process. It is noted that to prevent the frame generator 112 from becoming permanently locked in a fail state, the frame generator 112 determines the reason why the frame generation failed in the previous two attempts. If the frame generation failed in the previous two attempts due to factors other a failure in yet another previous frame generation attempt, the frame generation will fail. However, if the frame generation failed due to the failure of yet another previous attempt at frame generation, or if no failures were encountered, the frame generator 112 disregards the failure, if any, and proceeds to an end step 1110.

Referring again to the step 1000 (FIG. 9), if the frame generator 112 (FIG. 1) determines that the state in the frame generator 404 (FIG. 4) is "MODERATE_ACTION" or "HIGH_ACTION", the frame generator 112 proceeds to the step 1008. Moving to a step 1030, the frame generator 112 attempts to adjust the motion vectors that are associated with each of the macroblocks in the second base frame such that each of the motion vectors represent movement between the second base frame and first base frame. Significantly, each of the motion vectors may have been initially selected by the encoder 116 due to the fact the region identified by the motion vector provides a good match for the macroblock, and not because the image in the macroblock actually moved in the direction identified by the motion vector. Therefore, due to this fact, the frame generator 112 attempts to readjust any motion vectors that are not representative of movement of the image in the first and second base frames. The process for correcting the direction of each of the motion vectors of the second base frame is described in further detail below with reference to FIG. 12.

Next, at a step 1044, the frame generator 1044 performs motion vector filtering. The process for motion vector filtering is described below with reference to FIG. 16. However, in brief, the function of the motion vector filtering process is to eliminate outliers of any macroblock which, according the macroblock's associated motion vectors, is moving radically compared to its neighbors.

Next, at a state 1046, the frame generator 112 re-determines the state of the frame generator 112. In one embodiment of the invention, the frame generator 112 re-executes each of the steps shown in FIGS. 6, 7, and 8. Optionally, the frame generator 112 may skip selected steps that are not affected by the text detection and global motion vector correction process, e.g., determining duration of time between frames (step 618) and determining the number of blocks that are independently coded (step 622).

Continuing to a decision step 1048, the frame generator 112 determines whether the state changed from "MODERATE_ACTION" to "HIGH_ACTION" subsequent to executing the step 1046. If the state changed from "MODERATE_ACTION" to "HIGH_ACTION", the frame generator proceeds to a state 1050. At the state 1050, the frame generator 112 changes the state back to "MODERATE_ACTION." The frame generator 112 then proceeds to a state 1052.

Referring again to the decision state 1048, if the frame generator 112 determines that the state did not change from "MODERATE_ACTION" to "HIGH_ACTION", the frame generator proceeds to the state 1052.

From either the decision step 1048 or the step 1050, the frame generator 112 proceeds to a step 1052. At the step 1052, the frame generator 112 repeats the process for motion vector filtering (the process first being performed in step 1044). The process for motion vector filtering is described below with reference to FIG. 16.

Next, the frame generator 112 returns to the step 1012 and performs text detection (discussed above).

Referring again to the step 1000 (FIG. 9), if the frame generator 112 (FIG. 1) determines that the step in the frame generator 404 (FIG. 4) is "ABORT", "SMALL_CHANGE" or "BIG_CHANGE", the frame generator 112 proceeds to the step 1009. Next, at a step 1010, the frame generator 112 stops analyzing the first and second base frames for frame generation. At the step 1010, the frame generator 112 has determined that it is inappropriate to generate an intermediate frame and therefore fails the frame generation process. The process flow returns to the step 502 (FIG. 5) wherein the frame generator 112 analyzes the next two frames which are provided by the decoder 118.

Global Motion Correction

Figure 12:
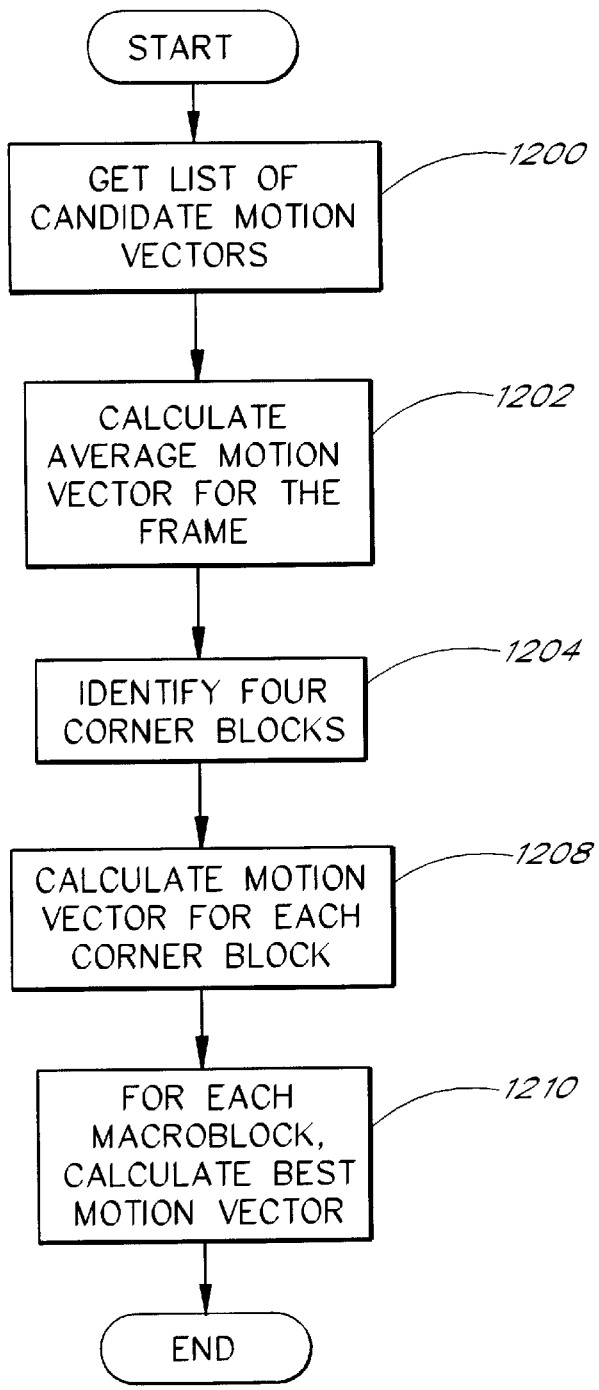
FIG. 12 is a flowchart illustrating a global motion correction process for recalculating each of the macroblocks that are dependently coded in two base frames of FIG. 5.
Figure 13B:
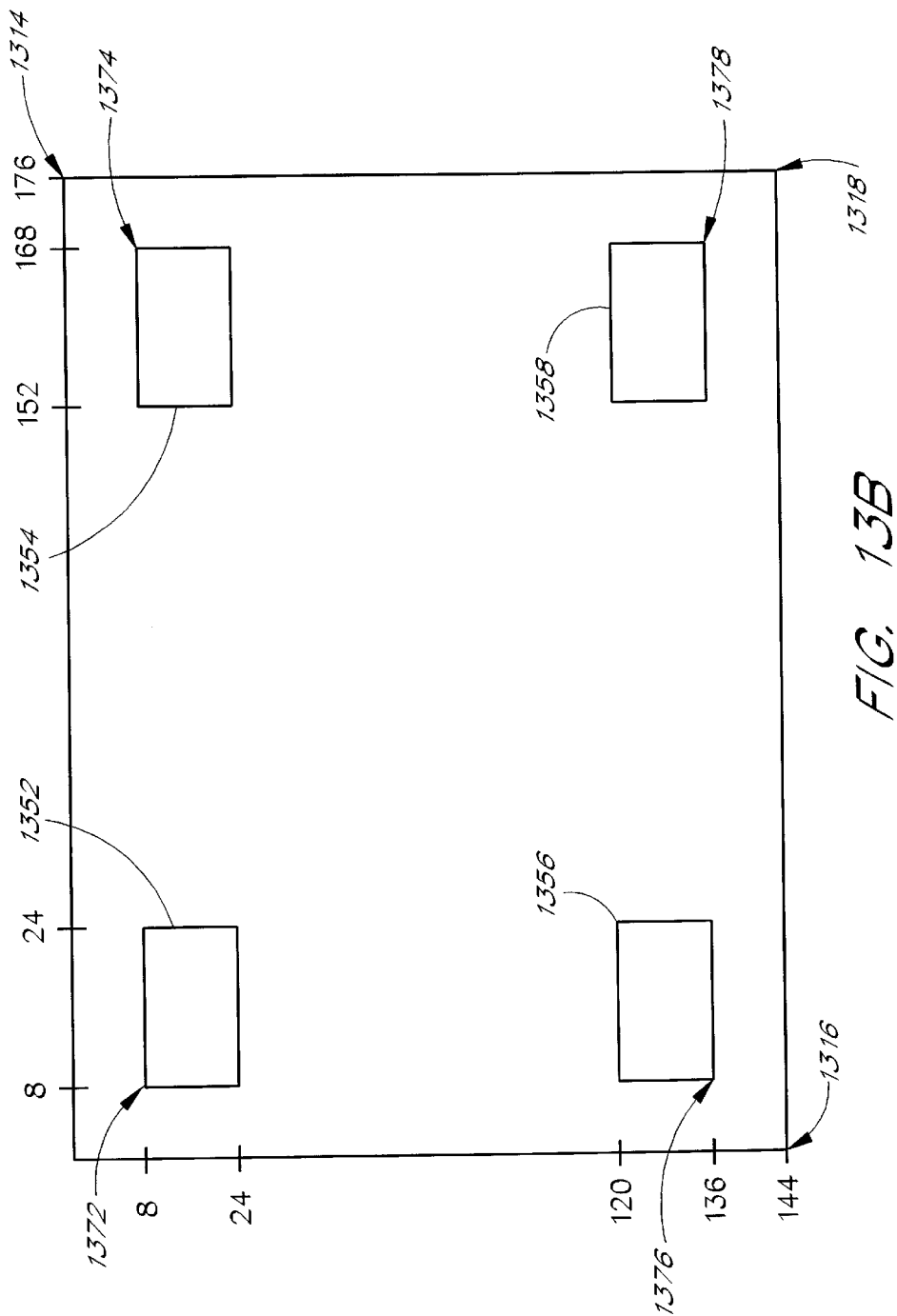
FIG. 13B is a flowchart illustrating four blocks of the second frame that are analyzed as apart of the global motion correction process of FIG. 12.

FIG. 12 is a flowchart illustrating a process for determining whether any of the macroblocks in the second base frame has a better matching region in the first base frame than is referenced by the motion vector currently associated with each of the macroblocks.

Starting at a step 1200, the frame generator 112 (FIG. 1) obtains a list of candidate motion vectors that are used to identify a possibly better matching region than the region that is currently associated with each of the macroblocks. Initially, the list of candidate motion vectors includes the current motion vector for the macroblock and a null vector. Steps 1202 through 1208 describe in further detail the process for gathering the remainder of the candidate motion vectors.

At a next step 1202, the frame generator 112 (FIG. 1) calculates the average motion vector of each of the macroblocks in the second base frame. The average motion vector is then used as one of the candidate motion vectors.

Continuing to a step 1204, the frame generator 112 (FIG. 1) identifies four blocks 1302, 1306, 1308, 1310 (FIG. 13A) that are each respectively positioned proximate to one of the four corners 1312, 1314, 1316, 1318 of the second base frame. It is noted that the corner blocks do not necessarily correspond to macroblocks. Thus, the corner blocks 1302, 1306, 1308, 1310 may be smaller or larger in pixel size than the macroblocks. In one embodiment, each of the four corner blocks 1302, 1304, 1306, 1308 is positioned such that each of the corners 1322, 1324, 1326, 1328 of the four corner blocks 1302, 1304, 1306, 1308 is offset from one of the corners 1312, 1314, 1316, 1318 of the second frame by 8 pixels in both the x and y directions. For example, block 1302 is positioned at pixel 8, 8 and offset from the corner 1312 by 8 pixels in both the x and y directions. Further, for example, the corner 1324 of the corner block 1304 is offset from the corner 1314 by 8 pixels in both the x and y directions.

Once the frame generator 112 (FIG. 1) identifies each of the four corner blocks 1302, 1306, 1308, 1310, the frame generator 112 analyzes a number of blocks in the first base frame looking for a block that matches the corner blocks 1302, 1304, 1306, 1308. In one embodiment of the invention, for each of the corner blocks 1302, 1304, 1306, 1308, the frame generator 112 analyzes blocks 1352, 1354, 1356, 1358 in the first base frame, the blocks 1352 1354, 1356, 1358 being in the same respective spatial position of the corner blocks 1302, 1304, 1306, 1308 in the second base frame. In addition to these four corner blocks, the frame generator 112 analyzes in the first base frame each block that has a corner that is not more than 8 pixels away from a corner 1372, 1374, 1376, 1378 of the respective blocks 1352, 1354, 1356, 1358 in either the x or the y directions.

Figure 14:
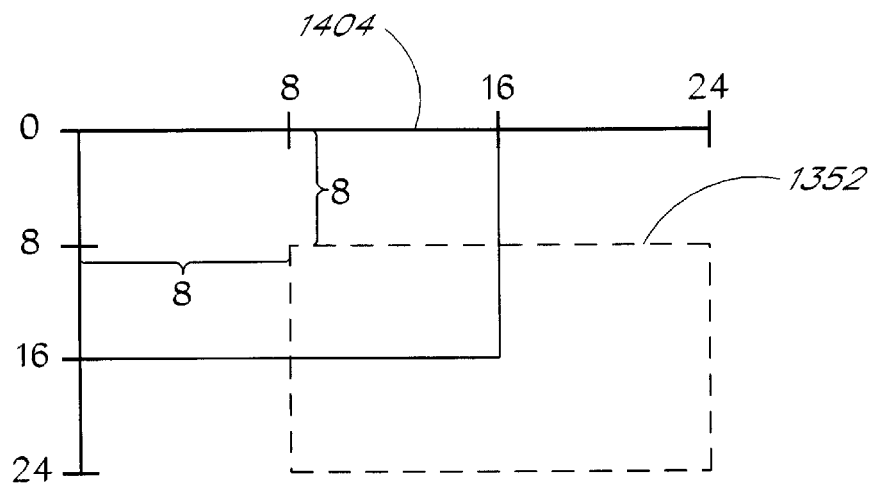
FIGS. 14 and 15 are representational diagrams that illustrate various blocks in addition to the blocks shown in FIG. 13 that are analyzed as part of the global motion correction process of FIG. 12.
Figure 15:
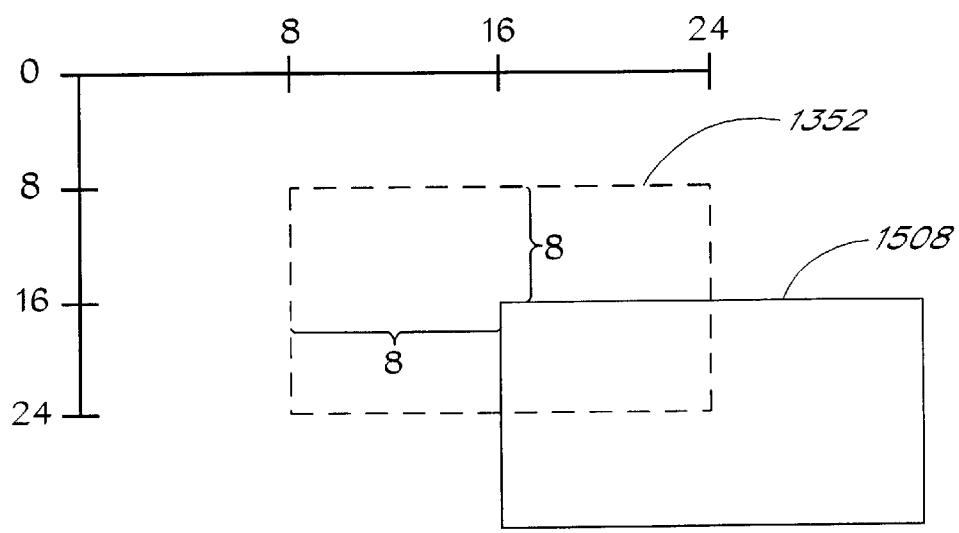

For example, in regard to block 1302 and referring to FIGS. 14 and 15, the frame generator 112 analyzes each block in the first base frame having an upper left hand corner in a square window extending from 0, 0 to 16, 16. Block 1404 (FIG. 14) and block 1508 (FIG. 15) are each blocks that are examined in this process.

To determine the closeness of a match between the corner block in the second base frame and one of the selected blocks in the first base frame, the frame generator 112 performs Equation 2.

| (2) | MATCH = SUM + (8192 * RADIUS). |
|---|---|
| SUM = | the sum of the square differences between each of the pixels in one of the corner blocks in the first base frame and each of the pixels in same spatial location in the selected block in the first base frame. |
| RADIUS = | the greater of the differences in distance in pixels between the selected block and the corner block with respect to the x and y axis. |

The lower the value of MATCH, the better is the match between the selected block in the first base frame and the selected one of the corner blocks 1302, 1306, 1308, 1310.

Continuing to a step 1208, once the blocks in the first base frame which provide a good match for each of the corner blocks 1302, 1304, 106, 1308 are identified, a motion vector is calculated between the corner blocks 1302, 1304, 1306, 1308 and the identified blocks.

The frame generator 112 (FIG. 1) uses the four motion vectors that are calculated in the step 1208 and that are associated with each of the corner blocks 1302, 1306, 1308, 1310 (FIG. 13A) as the last four of the candidate motion vectors.

In summary, the group of candidate motion vectors includes: a null vector, the current motion vector, an average motion vector for the second base frame, and the four motion vectors calculated with respect to each of the corner blocks in the steps 1204 and 1208.

Next, in a step 1210, the frame generator 112 determines, for each macroblock in the second base frame, which of the candidate motion vectors should be used for frame generation. To identify the most appropriate motion vector, the frame generator 112 applies Equation 3 in conjunction with a selected macroblock and in sequence with each of the candidate motion vectors.

| (3) | MATCH = SUM + 4096 ($\lvert x \rvert$ + $\lvert y \rvert$). |
|---|---|
| SUM = | The sum of the square differences between each of the pixels in the selected macroblock and each of the pixels in same spatial location in the macroblock identified by a selected candidate motion vector. |
| x = | The x component of the selected candidate motion vector. |
| y = | The y component of the selected candidate motion vector. |

After applying Equation 3 to each of the candidate motion vectors for a selected macro block, the frame generator 112 examines the value of the variable MATCH that has been determined using each of the candidate motion vectors. The frame generator 112 then selects the motion vector that has the lowest determined MATCH value and resets the motion vector of the macroblock to the selected motion vector. The frame generator 112 then applies Equation 3 with respect to the remainder of the macroblocks and in conjunction with each of the candidate motion vectors.

Motion Vector Filtering

Figure 16:
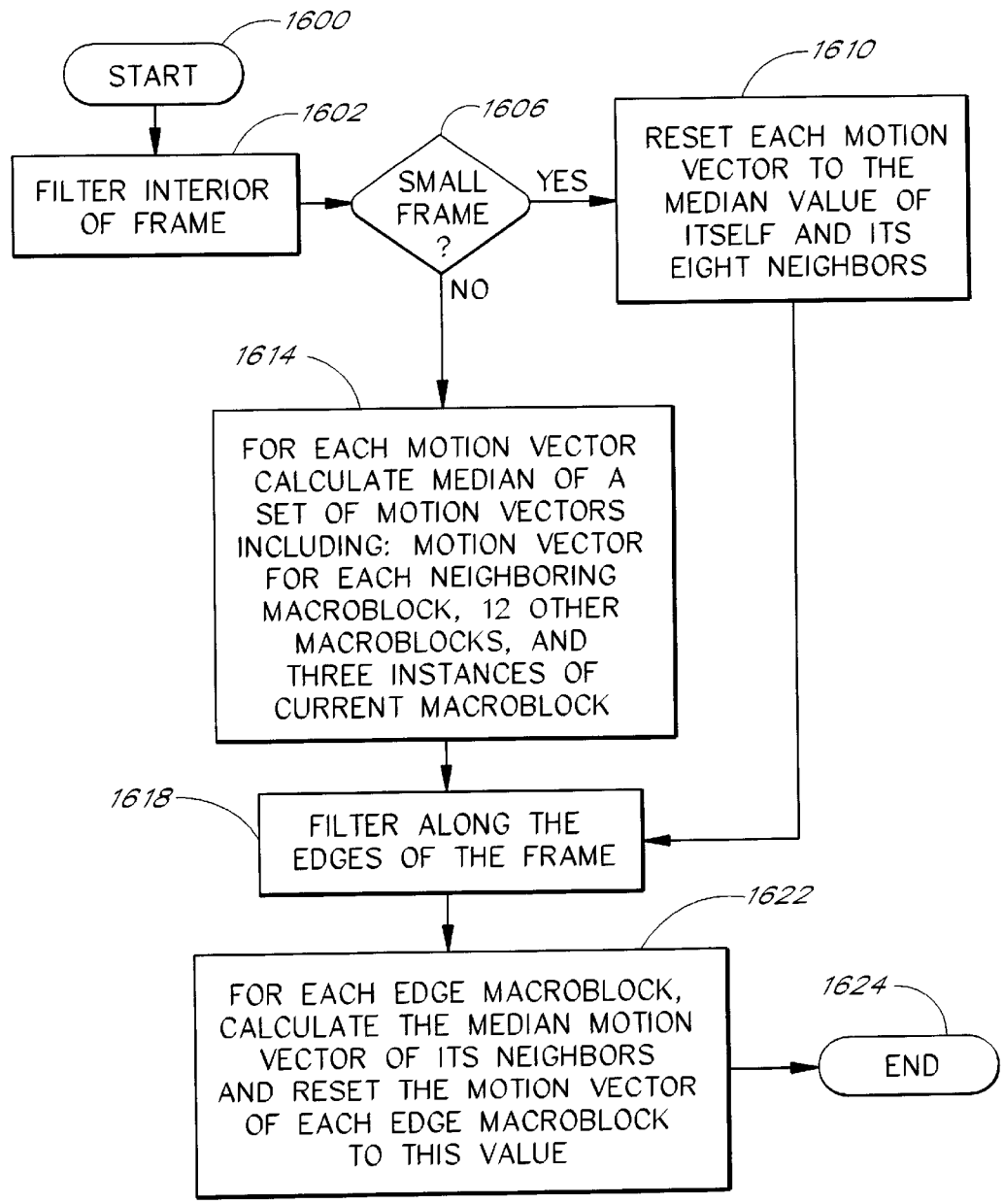
FIG. 16 is a flowchart illustrating motion vector filtering process for modifying the motion vectors of the base frame prior to the frame generation process.

FIG. 16 is a flowchart illustrating a process for filtering the motion vectors in the base frames. The filtering process ensures that a macroblock does not have an associated region that is radically different than the motion vector associated with the macroblock's neighbors. FIG. 16 illustrates in further detail the steps that occur in steps 1044 and 1052 of FIG. 9. It is noted that motion vector filtering is performed with respect to both the first and second base frames. However, for convenience of description, reference is only made to the second base frame in the following discussion.

After starting at a step 1600 (FIG. 16), the frame generator 112 (FIG. 1) proceeds to a step 1602, and filters the interior of the second base frame. Steps 1606, 1610, and 1614 describe in further detail the process for filtering the interior of the second base frame.

Moving to a decision step 1606, the frame generator 112 (FIG. 1) determines whether the second base frame is a small frame. In one embodiment of the invention, a frame is deemed to be small if the width of the second base frame of less than about 200 pixels, or if height of the frame is less than about 180 pixels. If the frame generator 112 determines that the second base frame is a small frame, the frame generator 112 proceeds to a step 1610. At the step 1610, the frame generator 112 resets each motion vector for each macroblock that is not positioned on the edge of the second base frame to the median value of the motion vectors of its eight neighbors.

Referring again to the step 1606, if the frame generator 112 (FIG. 1) determines that the second base frame is not a small frame, the frame generator 112 proceeds to a step 1614. At the step 1614, the frame generator 112 for each macroblock determines a median value of a set of macroblocks, the set including: the motion vector of each of the macroblock's neighboring the macroblock, 12 other proximally located macroblocks, and three instances of the current macroblock. The frame generator 112 (FIG. 1) then resets the value of the macroblock to this calculated median.

Figure 17:
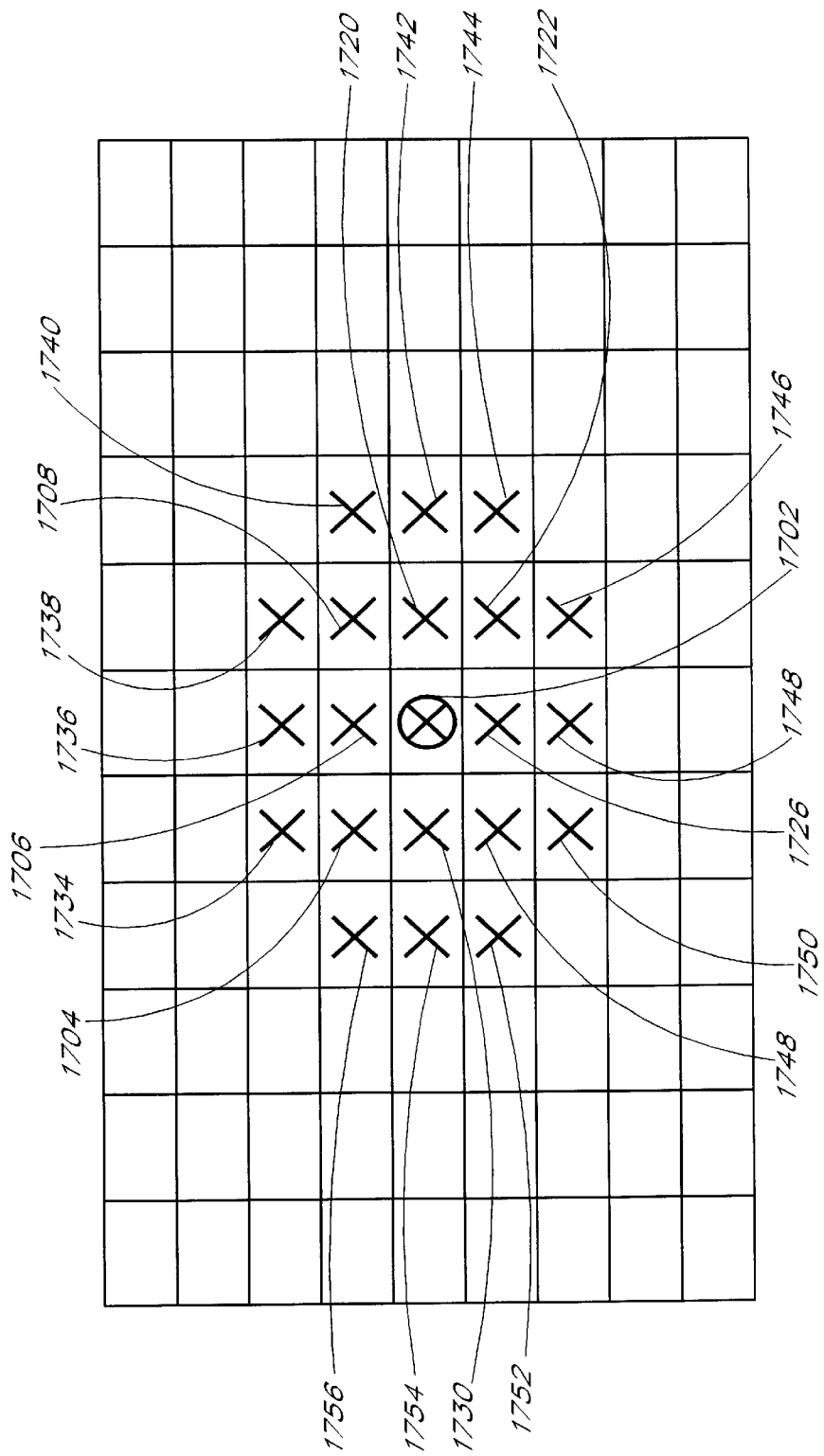
FIG. 17 is a representational diagram that illustrates which blocks are analyzed during the motion vector filtering process of FIG. 16 for a selected macroblock (designated by a circled X).

Referring to FIG. 17, the macroblocks that are analyzed by the frame generator 112 (FIG. 1) when performing step 1614 for an exemplary macroblock 1702 are illustrated. In regard to the macroblock 1702 (designated by a circled X), the frame generator 112 analyzes eight neighboring macroblocks 1704 through 1730 (each being designated by an X). In addition, the frame generator 112 analyzes twelve proximally situated macroblocks 1734–1756 (also designated by an X). After gathering the motion vectors for these macroblocks, the frame generator 112 puts these motion vectors in a motion vector list. Additionally, the frame generator 112 adds three instances of the motion vector that is currently associated with the macroblock 1702 to the motion vector list. The frame generator 112 then determines a median motion vector which is based upon the list of motion vectors. To determine the median, the frame generator 112 first determines a median x value for each of the motion vectors in the list. The frame generator then determines a median y value for each of the motion vectors in the list. The frame generator 112 combines the median x value and the median y value to make a new motion vector for the macroblock 1702.

From either the step 1610 or the step 1614, the frame generator 112 proceeds to a step 1618. At the step 1618, the frame generator 112 (FIG. 1) starts the filtering process for the edge macroblocks of the second base frame. Next, at the step 1622, the frame generator 112, for each edge macroblock, calculates the median motion vector of its immediate neighbors and resets the motion vector of a macroblock to this calculated value. For example, if the macroblock is on a non-corner edge of the second base frame, the frame generator 112 resets the value of macroblock to equal the median value of its 5 neighbors. Lastly, if the macroblock is positioned on a corner of the second base frame, framer generator 112 resets the value of the motion vector to its 3 neighbors.

Figure 18:
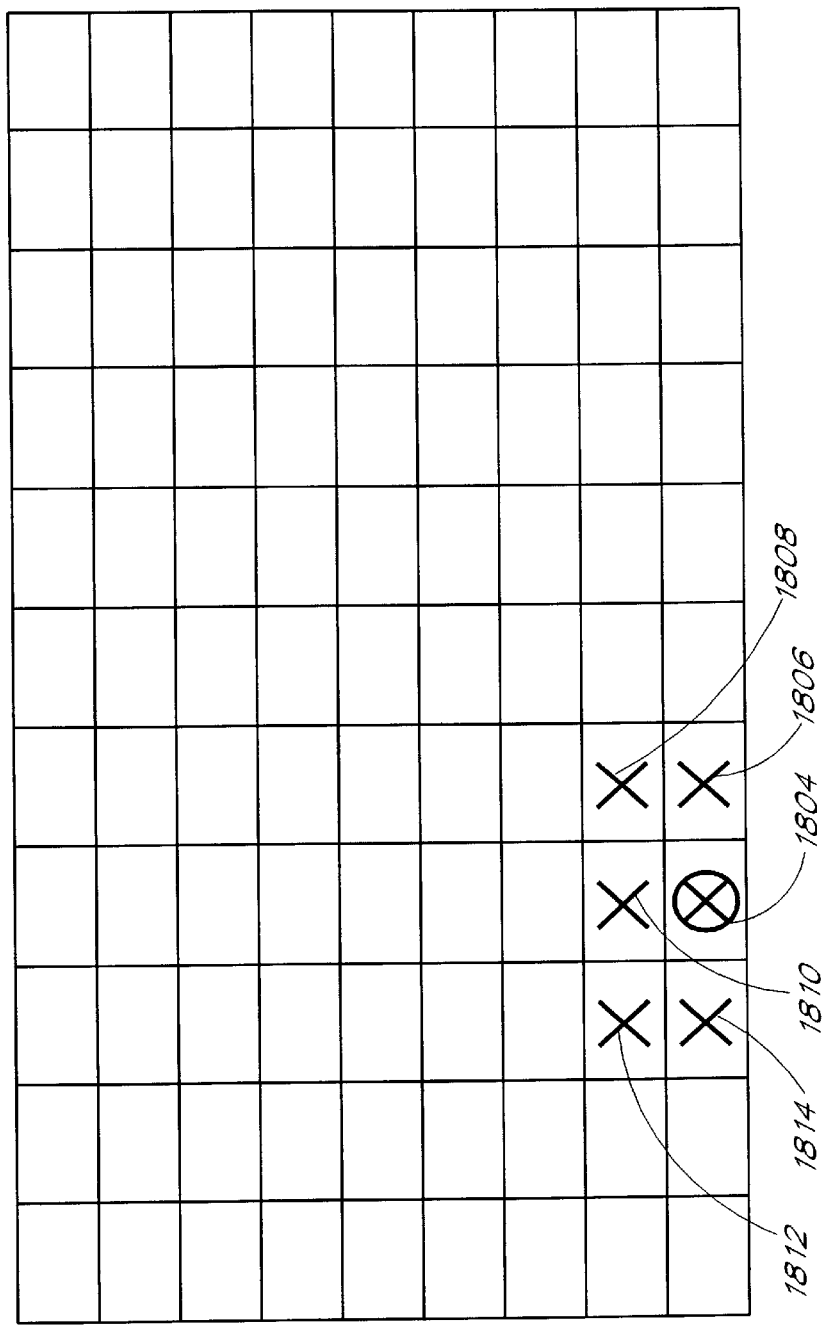
FIG. 18 is a representation diagram that illustrates which blocks are analyzed during the motion vector filtering process of FIG. 16 for a selected macroblock (also designated by a circled X).

Referring to FIG. 18, the macroblocks that are analyzed by the frame generator 112 (FIG. 1) when executing the step 1618 for an exemplary macroblock 1804 is illustrated. In regard to the macroblock 1804, the frame generator 112 analyzes five neighboring macroblocks 1806, 1808, 1810, 1812, and 1814 (each designated by an X). Lastly, at a step 1624 (FIG. 16), the process for motion vector filtering is completed.

Text Detection

Figure 19:
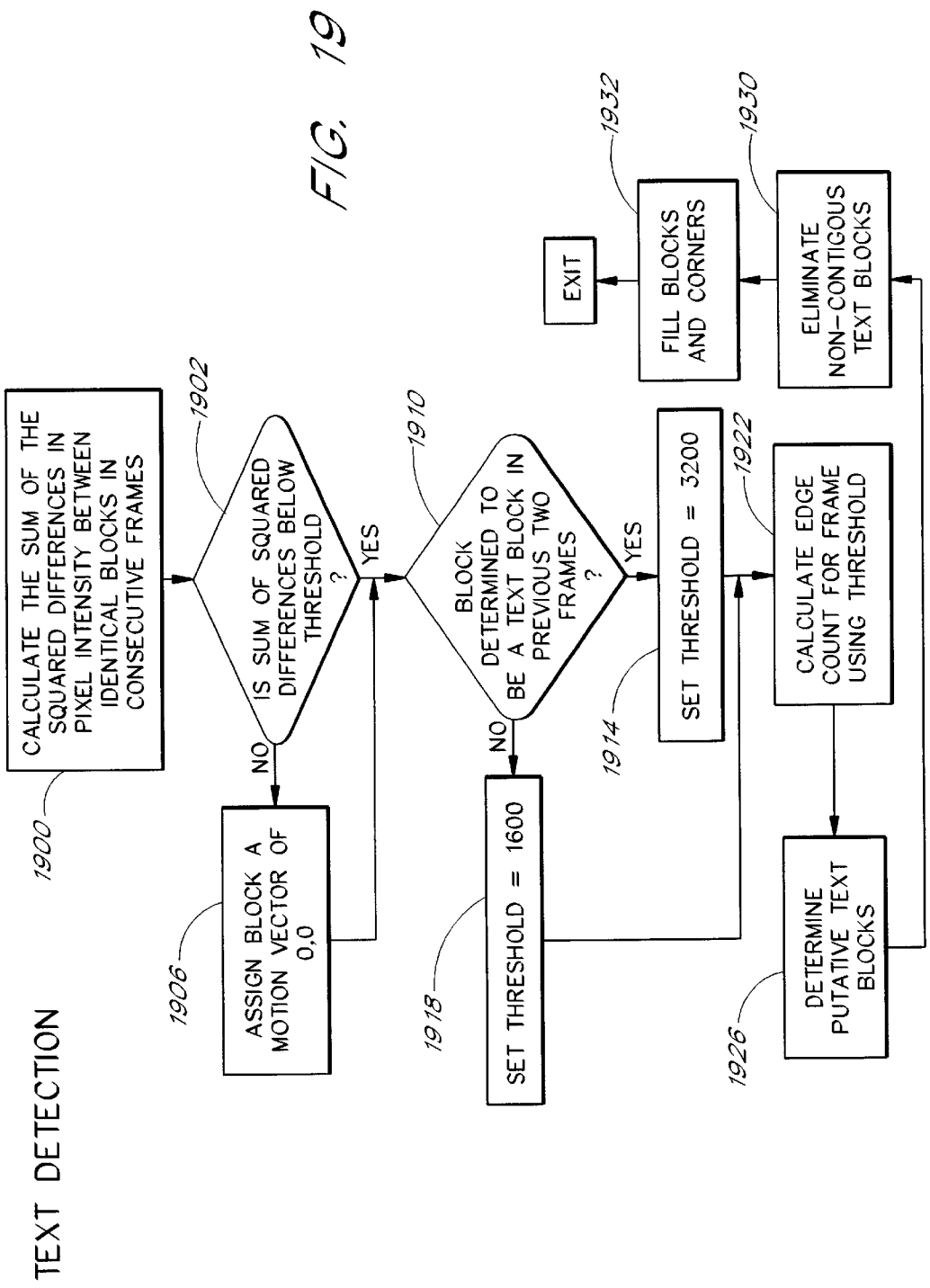
FIG. 19 a flowchart illustrating a text detection process that occurs as part of the frame analysis step shown in FIG. 5.

FIG. 19 is a flowchart illustrating a process for identifying portions of the first and second base frames that include text. FIG. 19 further illustrates the steps that occur in step 1012 of FIG. 9. Text detection identifies stationary text, such as captions, that overlay an active background. Subsequent to such detection, the frame generator 112 ensures that the stationary text blocks are not moved to a different position in the frame generation process.

In one embodiment of the invention, as a part of frame generation, the frame generator 112 marks macroblock quadrants (8×8 blocks of pixels) in the first base frame and the second base frame that are to remain stationary. In general, the text detection process follows three steps. First, the frame generator finds putative blocks of text. Second, the frame generator 112 disregards any putative text blocks that are non-contiguous with another text block. Lastly, the frame generator marks as putative text blocks any gaps and corners that are identified in the selected frame.

Starting the text detection process at a step 1900 (FIG. 19), the frame generator 112 (FIG. 1) calculates the sum of the squared difference in pixel intensity between identical positioned blocks in consecutive frames. This sum identifies the similarity between blocks that have the same spatial positioning in the first base frame and the second base frame. Continuing to a step 1902 (FIG. 19), for each block, the frame generator 112 (FIG. 1) determines whether the value calculated in the step 1900 for the block is below an eighth threshold. The eighth threshold identifies whether there has been a significant amount of change between the first and second base frames. While other thresholds may be more appropriate in other embodiments, in one embodiment of the invention, the eighth threshold is about 2500.

If the frame generator 112 determines that the value calculated for a block in the step 1900 is below the threshold, the frame generator 112 proceeds to a step 1906. At a step 1906, the frame generator 112 reassigns the motion vector of the blocks that fall within the eighth threshold to be equal to 0, 0. The frame generator 112 assumes that if the difference in the pixel intensity of two blocks having the same spatial position in two different frames is negligible, the block contains text and its motion vector for frame generation purposes should be null.

From either the step 1906, or the decision step 1902, assuming the sum of the squared differences for a given blocks was below the eighth threshold, the frame generator 112 (FIG. 1) proceeds to a decision step 1910 (FIG. 19). At the decision step 1910, if the frame generator 112 determines whether any of the blocks in the two previously provided frames were determined to be a text block, the frame generator 112 proceeds to a step 1914 with respect to those blocks. At the step 1914, the frame generator 112 sets the value of a variable "threshold" equal to 3200 for each block that was determined to be a text block when analyzing one of the two previous base frames. As will be described more fully below, the variable "threshold" identifies a value that must be surpassed to find an edge between two pixels.

Otherwise, if the frame generator 112 determines that any of the blocks have not been determined to be text blocks when analyzing the previous two base frames, the frame generator 112 proceeds to a step 1918 with respect to those blocks. At the step 1918, the frame generator 112 sets the value of the variable "threshold" equal to 1600 for each of the blocks that have been determined to be a text block in the previous two frames.

From either the step 1914 or the step 1918, the frame generator 112 proceeds to the step 1922. At the step 1922, the frame generator 112 determines for each block whether adjacent pixels in the block have varying intensity with respect to each other. If two pixels vary sufficiently in intensity, the frame generator 112 identifies these two pixels as forming an "edge" in the image. If enough edges are found in the block, the block is assumed to be a text block.

In one embodiment of the invention, the frame generator 112 applies Equations 4 and 6 with respect to each of the pixels in a selected block in the first base frame except the bottom-most row and the right-most column of pixels. Further, the frame generator 112 applies Equation 5 and 7 with respect to the pixels in the second base frame having the same spatial positioning as the selected pixels in the first base frame.

| | |
|---|---|
| (4) Eax | $= \text{sign}(A(x, y) - A(x + 1, y)) \times (A(x, y) - A(x + 1, y))^2$. |
| (5) Ebx | $= \text{sign}(B(x, y) - B(x + 1, y)) \times (B(x, y) - B(x + 1, y))^2$. |
| (6) Eay | $= \text{sign}(A(x, y) - A(x, y + 1)) \times (A(x, y) - A(x, y + 1))^2$. |
| (7) Eby | $= \text{sign}(B(x, y) - B(x, y + 1)) \times (B(x, y) - B(x, y + 1))^2$. |
| $A(x, y)$ | = the pixel intensity of a pixel in the selected block in the first base frame. |
| $B(x, y)$ | = the pixel intensity of a pixel in the selected block in the second base frame. |
| $\text{sign}(a)$ | = 1, if a > 0; 0, if a = 0; −1, if a > 0. |

The results of Equations 4 and 5 reveal the relative difference in intensity between two horizontally adjacent pixels in each of the first and second base frames. Similarly, the results of Equation 6 and 7 reveal the relative difference in intensity between two vertically adjacent pixels in each of the first and second base frames. For example, if the value of the variable "Eax" is positive, the left-most of the two referenced pixels has the most intensity of the two. Conversely, if the value of the variable "Eax" is negative, the right-most of the two pixels has the most intensity of the two. A similar relationship exists with respect to the pixels that are applied with the variables "Ebx", "Eay", and "Eby." Using the values of the variables "Eax", "Ebx", "Eay", "Eby" and "threshold", the frame generator 112 can count the number of edges that are formed by each of the pixels within a selected block.

In one embodiment of the present invention, the frame generator 112 uses a variable "edge_count" to assist in determining the number of edges in the selected block. Once the values of "Eax," "Ebx", "Eay", and "Eby" have been calculated, the frame generator 112 adjusts the value of edge_count based upon these values. Table 3 sets forth below a plurality of conditions that are applied to determine the number of edges in the selected block. If the condition identified in the first column of the table is satisfied, the frame generator 112 adjusts the value of the variable edge_count based upon the result identified in the second column of the table

TABLE 3

| Condition | Result |
|---|---|
| (Eax > threshold) and (Ebx > threshold) | Increment edge_count by 2 |
| (Eax < -threshold) and (Ebx < -threshold) | Increment edge_count by 2 |
| (Eax > threshold) and (Ebx < threshold) | Decrement edge_count by 1 |
| (Eax < -threshold) and (Ebx > -threshold) | Decrement edge_count by 1 |
| (Ebx > threshold) and (Eax < threshold) | Decrement edge_count by 1 |
| (Ebx < -threshold) and (Eax > -threshold) | Decrement edge_count by 1 |
| (Eay > threshold) and (Eby > threshold) | Increment edge_count by 2 |
| (Eay < -threshold) and (Eby < -threshold) | Increment edge_count by 2 |
| (Eay > threshold) and (Eby < threshold) | Decrement edge_count by 1 |
| (Eay < -threshold) and (Eby > -threshold) | Decrement edge_count by 1 |
| (Eby > threshold) and (Eay < threshold) | Decrement edge_count by 1 |
| (Eby < -threshold) and (Eay > -threshold) | Decrement edge_count by 1 |

The frame generator 112 applies Equations 4–7 for each of the pixels within the blocks in a selected spatial position in the first and second base frames. Upon analyzing a new block in a different spatial position, the frame generator 112 resets the value of variable "edge_count" equal to zero.

Next, at a step 1926 the frame generator 112 determines which group of blocks are going to be putatively designated as text blocks. In one embodiment of the invention, if the variable "edge_count" is greater than 10 for a selected block, the frame generator 112 designates this block as a putative text block.

Continuing to a step 1930, the frame generator 112 eliminates any block from the putative group of text blocks which is not immediately bordering another one of the putative text blocks. In one embodiment of the invention, the term border refers to the blocks immediately above, below, to the left and to the right of the selected block At the step 1930, the frame generator 112 may optionally determine whether there are a sufficient number of putative text blocks in the putative text block group to allow for the conclusion that the putative text blocks represent text. For example, in one embodiment, if the number of putative text blocks is less than 6, the frame generator 112 removes all of the of the blocks from the putative text block group.

Further, at the step 1930, the frame generator 112 may also optionally determine whether the number of blocks in the putative text block group exceeds a text block threshold. If too many text blocks are detected, the frame generation 112 assumes that the first and second base frames contain predominantly text and that the frame generation in this instance may produce unexpected results. If the number of blocks in the putative block exceed the text block threshold, the frame generator 112 fails the frame generation based upon the first and the second base frames. In one embodiment, the text block threshold is predefined to be equal about 30. In another embodiment of the invention, the text block threshold is calculated on an ad-hoc basis.

Continuing to a step 1933, the frame generator 112 analyzes the putative text block groups to determine whether any gaps or missing corners can be identified. In one embodiment of the invention, a selected block is added to the putative text block group if there are putative text blocks: (i) positioned both above and below the selected block; (ii) positioned both to the left and the right of the selected block; (iii) positioned below, to the left, and below and to the left of the selected block; (iv) positioned below, to the right, and below and to the right of the selected block; (v) positioned above, to the left, and above and to the left of the selected block; or (vi) positioned above, to the right, and above and to the right of the selected block.

Figure 20:
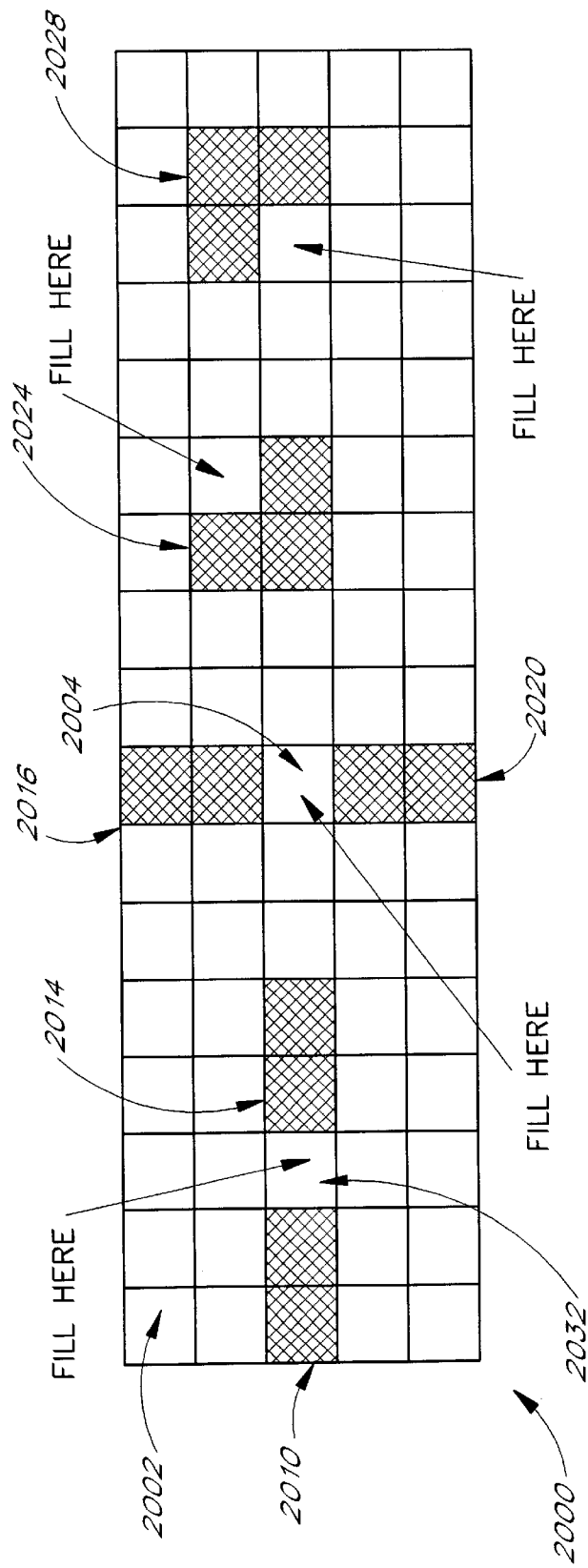
FIG. 20 is a representational diagram illustrating a number of blocks that have been putatively marked as text blocks during the text detection process of FIG. 19.

For example, referring to FIG. 20, a portion of a frame 2000 is shown. The frame 2000 is divided into a plurality of 8×8 blocks 2002. A selected number of the blocks 2002 have been putatively identified (via shading) as text blocks. Further, as can be readily seen by visual inspection, a number of the blocks 2002 are bordering each other and define 6 block shapes 2010, 2014, 2016, 2020, 2024, and 2028. In the step 1934, the frame generator 112 analyzes each of the blocks 2002 to identify gaps and missing corners. Upon reaching a block 2032, the frame generator 112 determines that a putative text block is positioned both to the right and to the left of the block 2032. Accordingly, the frame generator 112 adds the block 2032 to the putative text block group.

In one embodiment of the invention, the frame generator 112 performs a left to right, top to bottom traversal of each of the blocks 2002 in the frame 2000. However, other traversal methods may be employed. Further, in one embodiment of the present invention, the frame generator 112 does not consider newly added putative text blocks when filling in the gaps and missing corners. For example, as was discussed above, block 2032 was added as a putative text block due to the positioning of other putative text blocks. However, in this embodiment, the frame generator 112 does not consider block 2032 as being putatively marked when analyzing the other blocks.

Alternatively, in another embodiment, the frame generator 112 includes newly added putative text blocks when analyzing the remainder of the blocks. For example, in this embodiment, after determining that the block 2032 should be added as a putative text block, the frame generator 112 considers the block 2032 as being one of the putative text blocks for the remainder of the analysis. Further, in this embodiment, the frame generator 112 may perform multiple traversals of the blocks 2002, each traversal filling in new gaps or empty corners that are identified in a previous traversal.

Synthesis

Figure 21:
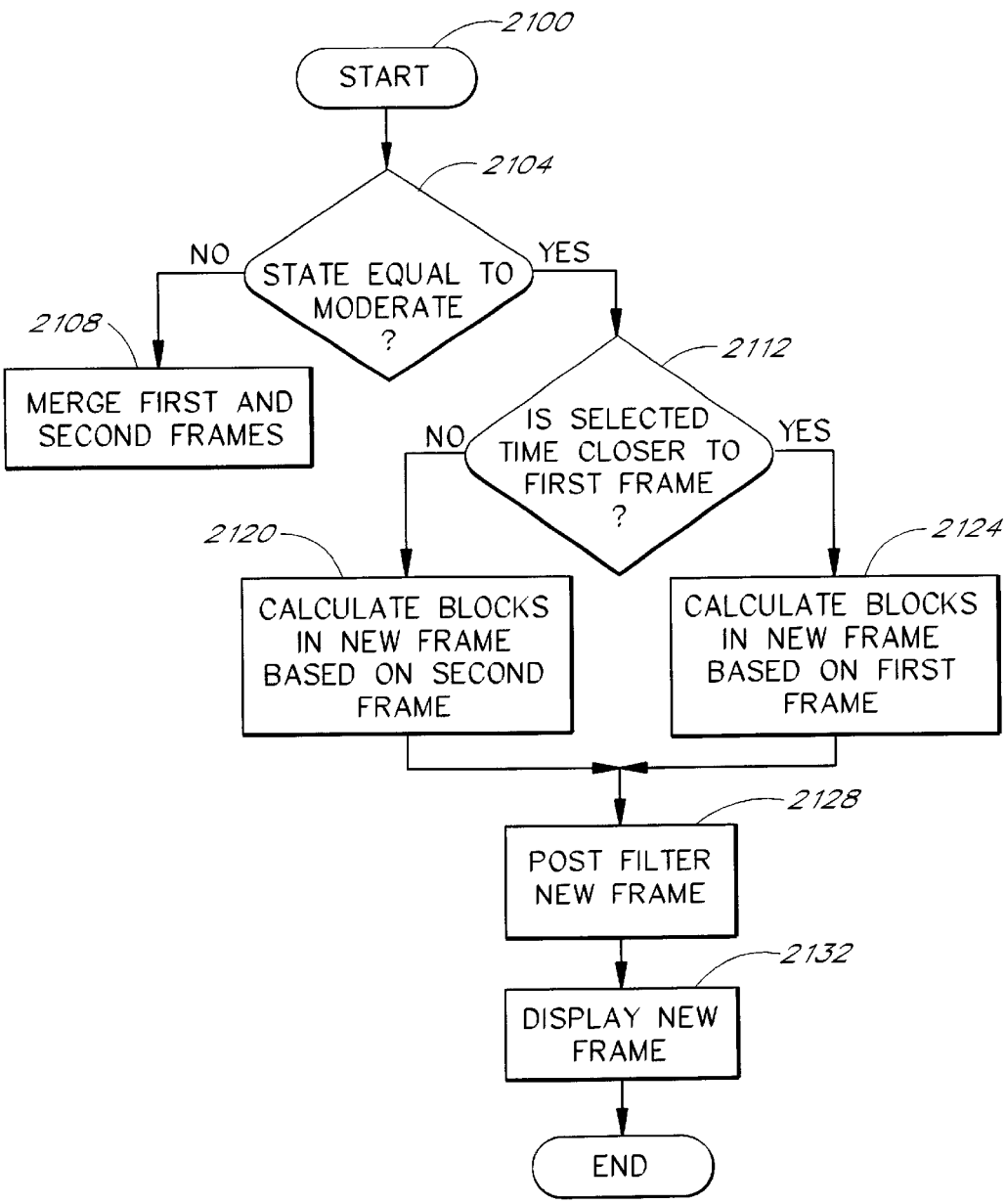
FIGS. 21 & 22 are flowcharts illustrating in further detail the steps contained in the frame generation step shown in FIG. 5.

FIG. 21 illustrates a process for generating intermediary frames based upon the first and second base frames. At a step 2100, the frame generator 112 has already analyzed the first and second base frames to determine the appropriateness of frame generation. Further, the frame generator 112 has averaged each of the motion vectors based upon the neighboring motion vectors. In addition, the frame generator 112 has tagged a selected number of blocks as being text blocks. At this point, the frame generator 112 is ready to generate one or more intermediate frames.

It is noted that the frame generator 112 may be called more than once thereby generating more than one intermediary frames. In one embodiment of the invention, the frame generator 112 receives a time reference that identifies where in time the generated frame is to be displayed in relation to the first and second base frame. For example, a first base frame may be designated for display at a time 100 milliseconds. Further, the second base frame may be designated for display at a time 300 milliseconds. The frame generator 112 using the first and second base frames can generate one intermediate frame for display at a time 200 milliseconds. Alternatively, the frame generator 112 can be requested to provide two intermediate frames, one for display at a time 150 milliseconds, the other at a time 250 milliseconds. The frame generator 112 can be used to generate any number of intermediate frames. Further, the frame generator 112 can be used to generate yet another frame using a generated frame as one of the base frames. Also, the frame generator 112 can be adapted to receive a request that identifies one or more intermediate times instead of being provided the intermediate times in succession.

Moreover, for example, the intermediate time can be represented as an integer ranging between the values 1 and 255. In this embodiment, an intermediate time of 1 represents that the frame to be generated is to be presented proximal in time to the first base frame. An intermediate time of 255 represents that the frame to be generated is to be presented proximal in time to the second base frame. For convenience of description, the remainder of the description will describe the operation of frame synthesis with reference to a time interval that is measured as a value falling between 1 and 255.

Continuing to a step 2104, the frame generator 112 determines whether the state of the state machine 404 is equal to "MODERATE_ACTION." If the step is not equal to "MODERATE_ACTION", the frame generator 112 proceeds to a step 2108.

At the step 2108, the frame generator 112 merges the first and second base frames using a linear average. In one embodiment of the invention, as part of this step, the frame generator 112 applies Equation 8 for each pixel position within the first and second base frames.

| (8) generated frame(x, y) | = (256 − time_reference)/256 * first frame(x, y) + time_reference/256 * second frame(x, y) |
|---|---|
| time_reference | = an integer ranging between 1 and 255, the integer indicating the temporal proximity of the frame to be generated with respect to the first and second base frames. |
| first frame(x, y) | = the intensity value of a pixel at a position x, y in the first base frame. |
| second frame(x, y) | = the intensity value of a pixel at a position x, y in the second base frame. |

Referring again to the step 2104, if the frame generator 112 determines that the state is equal to "MODERATE_ACTION", the frame generator 112 proceeds to the step 2112. At the state 2112, the frame generator 112 determines whether the frame to be generated is to be presented in time closer to the first base frame or to the second base frame. If the frame generator 112 determines that the frame to be generated is to be presented closer in time to the second base frame, the frame generator 112 proceeds to a step 2120. Otherwise, if the frame generator 112 determines that the frame to be generated is to be presented closer in time to the first base frame, the frame generator 112 proceeds to a step 2124. For example, in the embodiment of the invention, if the value of the variable "time reference" is greater than or equal to 128, the frame generator 112 determines that the frame to be generated is closer to the second base frame. Furthermore, if the value of the variable "time_reference" is less than 128, the frame generator 112 determines that the frame to be generated is closer to the first base frame.

At the state 2120, the frame generator 112 generates a frame using the macroblock information from the second base frame. As part of the state 2120, the frame generator 112 generates four "reference" motion vectors for each of the macroblocks from the motion vector of the selected macroblock and motion vectors of neighboring macroblocks. Each motion vector represents motion of one of four quadrants, or "blocks", within a selected macroblock. If the selected macroblock is located on the frame edge, then motion vectors for those quadrants along the edge are given a motion vector equal to the one for the entire macroblock. Otherwise, for quadrants internal to the frame, the frame generator 112 applies Equations 9–16 with respect to each of the macroblock positions in the frame to be generated.

(9) $x_{upper\_left} = -((256 - time\_reference)/256)* ((4*MV(x, y) \cdot x + 2*MV(x, y - 1) \cdot x + 2*MV(x - 1, y) \cdot x + MV(x - 1, y - 1) \cdot x)/9)$

(10) $y_{upper\_left} = -((256 - time\_reference)/256)* ((4*MV(x, y) \cdot y + 2*MV(x, y - 1) \cdot y + 2*MV(x - 1, y) \cdot y + MV(x - 1, y - 1) \cdot y)/9)$

(11) $x_{lower\_left} = -((256 - time\_reference)/256)* ((4*MV(x, y) \cdot x + 2*MV(x, y + 1) \cdot x + 2*MV(x - 1, y) \cdot x + MV(x - 1, y + 1) \cdot x)/9)$

(12) $y_{lower\_left} = -((256 - time\_reference)/256)* ((4*MV(x, y) \cdot y + 2*MV(x, y + 1) \cdot y + 2*MV(x - 1, y) \cdot y + MV(x - 1, y + 1) \cdot y)/9)$

(13) $x_{upper\_right} = -((256 - time\_reference)/256)* ((4*MV(x, y) \cdot x + 2*MV(x, y - 1) \cdot x + 2*MV(x + 1, y) \cdot x + MV(x + 1, y - 1) \cdot x)/9)$

(14) $y_{upper\_right} = -((256 - time\_reference)/256)* ((4*MV(x, y) \cdot y + 2*MV(x, y - 1) \cdot y + 2*MV(x + 1, y) \cdot y + MV(x + 1, y - 1) \cdot y)/9)$

(15) $x_{lower\_right} = -((256 - time\_reference)/256)* ((4*MV(x, y) \cdot x + 2*MV(x, y + 1) \cdot x + 2*MV(x + 1, y) \cdot x + MV(x + 1, y + 1) \cdot x)/9)$

(16) $y_{lower\_right} = -((256 - time\_reference)/256)* ((4*MV(x, y) \cdot y + 2*MV(x, y + 1) \cdot y + 2*MV(x + 1, y) \cdot y + MV(x + 1, y + 1) \cdot y)/9)$

| time_reference = | An integer ranging between 1 and 255, the integer indicating the temporal proximity of the generated frame to the first and second base frames. |
|---|---|
| $x_{upper\_left}$ = | The x component of the motion vector for the upper left quadrant. |
| $y_{upper\_left}$ = | The y component of the motion vector for the upper left quadrant. |
| $x_{upper\_right}$ = | The x component of the motion vector for the upper right quadrant. |
| $y_{upper\_right}$ = | The y component of the motion vector for the upper right quadrant. |
| $x_{lower\_left}$ = | The x component of the motion vector for the lower left quadrant. |
| $y_{lower\_left}$ = | The y component of the motion vector for the lower left quadrant. |
| $x_{lower\_right}$ = | The x component of the motion vector for the lower right quadrant. |
| $y_{lower\_right}$ = | The y component of the motion vector for the lower right quadrant. |
| $MV(x, y) \cdot x$ = | the x component of a motion vector of a selected macroblock in a reference frame, the block being positioned x macroblocks from the top of a frame and y macroblocks from the left of the interpolated frame. |
| $Mv(x, y) \cdot y$ = | the y component of a motion vector of a selected macroblock in a reference frame, the block being positioned x macroblocks from the top of a frame and y macroblocks from the left of the interpolated frame. |

Equations 9–16 collectively yield the x and y components of the four "reference" motion vector. The frame generator 112 uses the reference motion vectors $<x_{upper\_left}, y_{upper\_left}>$, $<x_{upper\_right}, y_{upper\_right}>$, $<x_{lower\_left}, y_{lower\_left}>$ and $<x_{lower\_right}, y_{lower\_right}>$, with respect to a macroblock position to identify "base" regions in the first base frame. In generating the intermediate frame, the frame generator 112, retrieves, with respect to the macroblock, the "base" regions identified by the reference motion vectors $<X_{upper\_left}, y_{upper\_left}>$, $<x_{upper\_right}, y_{upper\_right}>$, $<x_{lower\_left}, y_{lower\_left}>$ and $<x_{lower\_right}, y_{lower\_right}>$ and places the base macroblock in the intermediate frame for each quadrant. However, in one embodiment of the invention, if the macroblock quadrant is determined to have video text, the frame generator 112 does not use the reference motion vector to select a base region. In this embodiment, the frame generator 112 performs a blending process which is further described below with reference to a step 2128.

Referring again to the decision step 2112, if the frame generator 112 determines that the frame to be generated is to be presented closer in time to the first base frame, the frame generator proceeds to the step 2124. At the step 2124, the frame generator 112 generates the intermediate frame using the macroblock information from the second base frame. As part of the state 2124, the frame generator 112 generates four "reference" motion vectors from the motion vector of the selected macroblock and motion vectors of neighboring macroblocks. Each motion vector represents motion of one of four quadrants, or "blocks", within a selected macroblock. If the selected macroblock is located on the frame edge, then motion vectors for those quadrants along the edge are given a motion vector equal to the one for the entire macroblock. Otherwise, for quadrants internal to the frame, the frame generator 112 applies Equations 17–24 with respect to each of the macroblock positions in the frame to be generated.

(17) $x_{upper\_left}$ = (time_reference/256)*
  ((4*MV(x, y) · x + 2*MV(x, y − 1) · x + 2*MV(x − 1, y) · x + MV(x − 1, y − 1) · x)/9)

(18) $y_{upper\_left}$ = (time_reference/256)*
  ((4*MV(x, y) · y + 2*MV(x, y − 1) · y + 2*MV(x − 1, y) · y + MV(x − 1, y − 1) · y)/9)

(19) $x_{lower\_left}$ = (time_reference/256)*
  ((4*MV(x, y) · x + 2*MV(x, y + 1) · x + 2*MV(x − 1, y) · x + MV(x − 1, y + 1) · x)/9)

(20) $y_{lower\_left}$ = (time_reference/256)*
  ((4*MV(x, y) · y + 2*MV(x, y + 1) · y + 2*MV(x − 1, y) · y + MV(x − 1, y + 1) · y)/9)

(21) $x_{upper\_right}$ = (time_reference/256)*
  ((4*MV(x, y) · x + 2*MV(x, y − 1) · x + 2*MV(x + 1, y) · x + MV(x + 1, y − 1) · x)/9)

(22) $y_{upper\_right}$ = (time_reference/256)*
  ((4*MV(x, y) · y + 2*MV(x, y − 1) · y + 2*MV(x + 1, y) · y + MV(x + 1, y − 1) · y)/9)

(23) $x_{lower\_right}$ = (time_reference/256)*
  ((4*MV(x, y) · x + 2*MV(x, y + 1) · x + 2*MV(x + 1, y) · x + MV(x + 1, y + 1) · x)/9)

(24) $y_{lower\_right}$ = (time_reference/256)*
  ((4*MV(x, y) · y + 2*MV(x, y + 1) · y + 2*MV(x + 1, y) · y + MV(x + 1, y + 1) · y)/9)

| | |
|---|---|
| time_reference = | An integer ranging between 1 and 255, the integer indicating the temporal proximity of the generated frame to the first and second base frames. |
| $x_{upper\_left}$ = | The x component of the motion vector for the upper left quadrant. |
| $y_{upper\_left}$ = | The y component of the motion vector for the upper left quadrant. |
| $x_{upper\_right}$ = | The x component of the motion vector for the upper right quadrant. |
| $y_{upper\_right}$ = | The y component of the motion vector for the upper right quadrant. |
| $x_{lower\_left}$ = | The x component of the motion vector for the lower left quadrant. |
| $y_{lower\_left}$ = | The y component of the motion vector for the lower left quadrant. |
| $x_{lower\_right}$ = | The x component of the motion vector for the lower right quadrant. |
| $y_{lower\_right}$ = | The y component of the motion vector for the lower right quadrant. |
| MV(x, y) · x = | the x component of a motion vector of a selected macroblock in a reference frame, the block being positioned x macroblocks from the top of a frame and y macroblocks from the left of the interpolated frame. |
| MV(x, y) · y = | the y component of a motion vector of a selected macroblock in a reference frame, the block being positioned x macroblocks from the top of a frame and y macroblocks from the left of the interpolated frame. |

Equations 17–24 collectively yield the x and y components of the four "reference" motion vector. The frame generator 112 uses the reference motion vectors $<x_{upper\_left}, y_{upper\_left}>$, $<x_{upper\_right}, y_{upper\_right}>$, $<x_{lower\_left}, y_{lower\_left}>$ and $<x_{lower\_right}, y_{lower\_right}>$, with respect to each of the macroblocks to identify "base" regions in the first base frame. In generating the intermediate frame, the frame generator 112, retrieves with respect to each of the macroblocks, the "base" regions identified by the reference motion vectors $<x_{upper\_left}, y_{upper\_left}>$, $<x_{upper\_right}, y_{upper\_right}>$, $<x_{lower\_left}, y_{lower\_left}>$ and $<x_{lower\_right}, y_{lower\_right}>$ and places the base macroblock in the intermediate frame for each quadrant. However, in one embodiment of the invention, if the macroblock quadrant is determined to have video text, the frame generator 112 does not use the reference motion vector to select a base region. In this embodiment, the frame generator 112 performs a blending process which further described below with reference to the step 2128.

From either the step 2124 or the step 2120, the frame generator 112 proceeds to the step 2128. At the step 2128, for each of the macroblock quadrants having video text in the base frame which was selected in the state 2112, i.e., the first or the second base frame, the frame generator 112 blends each of the pixels in the macroblock quadrant with a macroblock quadrant identically positioned within the other base frame. As part of the blending process, the frame generator 112 applies Equation 8 with respect to each of the pixels in the macroblock quadrants.

Continuing to a state 2128, the frame generator 112 filters the intermediate frame. The process for filtering the intermediate frame is set forth below with reference to FIG. 22.

Finally, in the state 2132, the generated intermediate frame is displayed to the user. In one embodiment of the invention, the frame generator 112 displays the intermediate frame to a display on the rendering computer 106 at a time corresponding to the offset time provided to the frame generator 112. In another embodiment of the invention, the intermediate frame is transmitted to a rendering program (not shown).

Post Synthesis Filtering

Figure 22:
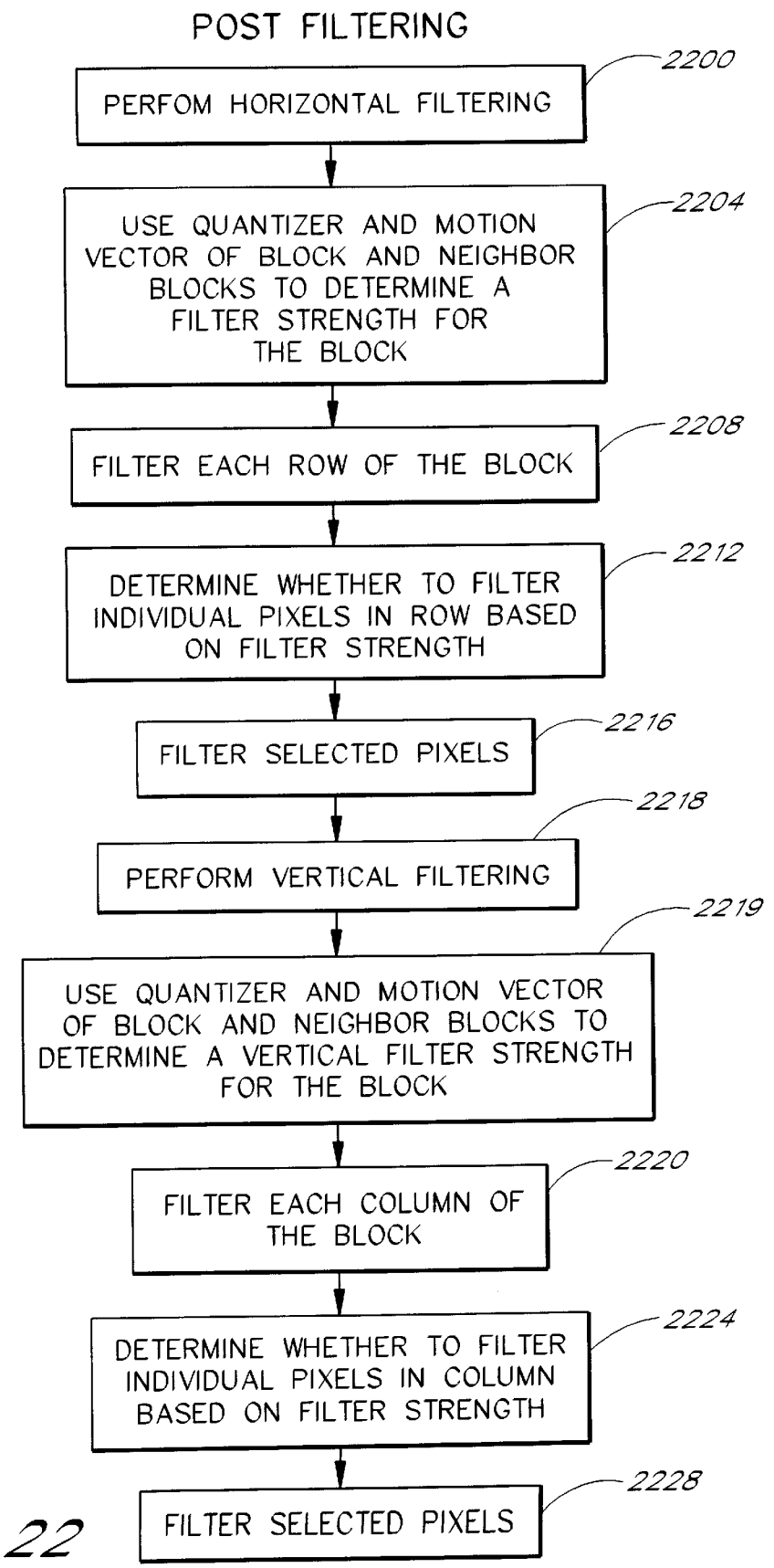

FIG. 22 illustrates a process for filtering an intermediate frame that has been generated by the frame generator 112. However, it is to be appreciated that other filtering processes may be used. The filtering process softens the discontinuity between adjacent macroblock quadrants (8×8 blocks) in the interpolated frame. As can be readily appreciated, after interpolating a frame from base frame data, blocks that were once adjacent in the base frame may no longer be adjacent in the interpolated frame. Although upon frame interpolation, a block from the base frame may serve as a good substitute for the interpolated block, the pixels at the edges of each of the interpolated blocks may not be a perfect match with the pixels at the edge of a neighboring block. Accordingly, in one embodiment of the present invention, a filtering process is applied to each of the interpolated frames.

As part of this process, the frame generator 112 analyzes for each block, the blocks to the right and below the selected block. The frame generator 112 first performs horizontal filtering of each of the rows of each of the blocks. Next, the frame generator 112 performs vertical filtering of each of the rows of each of the blocks. Steps 2200, 2204, 2208, 2212, and 2216 describe the process for horizontal filtering each of the rows in the blocks. Steps 2218, 2219, 2220, 2224 and 2228 describe the process for vertically filtering each of the columns in each of the blocks. In one embodiment of the invention, the frame generator 112 performs two left to right, top to bottom traversals of each of the blocks in the interpolated frame, one traversal for horizontal filtering, the other for vertical filtering. However, it is to be appreciated that other traversal schemes may be used.

Starting at a step 2200, the frame generator 112 begins the horizontal filtering process. The frame generator successively filters each of the rows in each of 8×8 blocks in the interpolated frame. Steps 2204, 2208, 2212, and 2216 further the describe the process for horizontally filtering each of the blocks. Steps 2204, 2208, 2212, and 2216 are executed for each of the 8×8 blocks in the interpolated frames.

Continuing to a step 2204, the frame generator 112 uses the quantizer for the interpolated frame to determine the strength of the filter that is to be used for horizontally filtering the block that is currently selected. In one embodiment of the invention, the quantizer for the interpolated frame is the same value as the quantizer for the base frame that was used to generate the interpolated frame. In one embodiment of the invention, the frame generator 112 uses Equation 25 for this calculation.

(25) filter_strength = SF × (|MV(x, y) · x − MV(x + 1, y) · x| + |MV(x, y) · y − MV(x + 1, y) · y|).
SF = 2, if quantizer > 15; 1, if 7 < quantizer ≦ 15; .5, if 4 < quantizer ≦ 7; or 0, if quantizer ≦ 4.
MV(x.y) · x = the x component of a motion vector of a selected 8 × 8 block in a reference frame that was used to generate the interpolated frame, the block being positioned x blocks from the top of a frame and y blocks from the left of the interpolated frame.
Mv(x, y) · y = the y component of a motion vector of a selected 8 × 8 block in a reference frame that was used to generate the interpolated frame, the block being positioned x blocks from the top of a frame and y blocks from the left of the interpolated frame.

The variable "filter_strength" is used by the frame generator 112 to determine the appropriateness of filtering each of the pixels in the currently selected block. It is noted that although the value of the variable "filter_strength" changes during the filtering process for a selected row, the value of the variable "filter_strength" is reset to the filter strength that is associated with the block upon filtering a new row.

Referring now to the steps 2208, 2212, and 2216, the process for horizontally filtering a selected block is described. The frame generator 112 begins an iterative process for each of the rows in the currently selected block. In overview, at the step 2208, the frame generator 112 selects one of the rows in the blocks. Next, at the step 2212, the frame generator 112 determines whether to filter selected pixels in the row. Lastly, in the step 2216, the frame generator 112 filters the selected pixels.

Referring again to the step 2208, the frame generator 112 filters a selected row of the currently selected block. Starting at the top row of the block, the frame generator 112 sets a variable "filter1" to reference the right most pixel of the selected row. Further, the frame generator 112 sets a variable "filter2" to reference the left most pixel in the same row that is in the block to the right of the selected block.

Moving to a step 2212, the frame generator 112 determines whether to filter the pixel referenced by the variable "filter1", depending on the value of the variable "filter_strength." In one embodiment of the invention, if the variable "filter_strength" is zero, the frame generator 112 stops filtering the currently selected row. However, it is to be appreciated that other thresholds may be used.

Otherwise, if the value of the variable "filter_strength" is greater than zero, the frame generator 112 proceeds to a step 2216. At the step 2216, the frame generator 112 filters the pixels referenced by the variables "filter1" and "filter2." The frame generator 112 assigns the pixel referenced by the variable "filter1" to equal the average of the pixel values of itself and of its neighbors to the left and to the right. Further, the frame generator 112 assigns the pixel referenced by the variable "filter2" to equal the average of the pixel values of itself and of its neighbors to the left and to the right. The frame generator 112 then divides the variable "filter_strength" by 2, rounding down. Next, the frame generator 112 reassigns the variable "filter1" to reference the pixel that is immediately to the left of the pixel that is referenced by "filter1." Further, the frame generator 112 reassigns the variable "filter2" to reference the pixel that is immediately to the right of the pixel that is currently referenced by the variable "filter2." The frame generator 112 then returns to the step 2212 and continues to filter the pixels in the selected row until the value of the variable "filter strength" is equal to zero. At this point, the frame generator 112 returns to the step 2208, to filter the next row in the selected block. Upon completion of filtering each of the rows in the currently selected block, the frame generator 112 returns to the step 2204 to recalculate the value of the variable "filter strength" for the next block which is to be selected.

Once all of the rows of pixels in each block of the interpolated frame have been filtered, the frame generator 112 proceeds to a step 2218 to filter each of the columns of each of the blocks. At a step 2218, the frame generator 112 successively filters each column of pixels in each block of the interpolated frame. The process for determining whether to filter the selected pixels within each of the rows is described in the step 2224 and 2228.

Continuing to a step 2219, the frame generator 112 uses the quantizer for the interpolated frame to determine the strength of the filter that is to be used for vertically filtering each of the blocks in the interpolated frame. In one embodiment of the invention, the frame generator 112 uses Equation 26 for this calculation.

(26) filter_strength = SF × (|MV(x, y) · x − MV(x, y + 1) · x| + |MV(x, y) · y − MV(x, y + 1) · y|).
SF = 2, if quantizer > 15; 1, if 7 < quantizer ≦ 15; .5, if 4 < quantizer ≦ 7; or 0, if quantizer ≦ 4.
Mv(x.y) · x = the x component of a motion vector of a selected block in a reference frame that was used to generate the interpolated frame, the block being positioned "x" blocks from the top of a frame and "y" blocks from the left of the frame.
MV(x, y) · y = the y component of a motion vector of a selected block in a reference frame that was used to generate the interpolated frame, the block being positioned "x" blocks from the top of a frame and "y" blocks from the left of the frame.

As was used above in reference to horizontal filtering, the variable "filter_strength" is used by the frame generator 112 to determine the appropriateness of filtering each of the pixels in a selected column of the current block.

Now, referring to steps 2220, 2224, and 2228, the process for vertically filtering the columns of pixels in the blocks is described. At these steps, the frame generator 112 begins an iterative process for each of the columns in a selected one of the blocks. In overview, at the step 2208, the frame generator 112 selects one of the columns in the selected block. Next, at the step 2212, the frame generator 112 determines whether to filter the pixels in the selected column. Lastly, in the step 2216, the frame generator 112 filters the selected pixels.

Referring specifically now to the step 2220, the frame generator 112 filters a selected row of the selected block. Starting at the left most column, the frame generator 112 sets a variable "filter1" to reference the bottom most pixel of the selected column. Further, the frame generator 112 sets a variable "filter2" to reference the top most pixel in the same column that is in the block beneath the selected block.

Moving to a step 2224, the frame generator 112, determines whether to filter the pixel referenced by the variable "filter1", depending on the value of the variable "filter_strength." In one embodiment of the invention, if the variable "filter_strength" is equal to zero, the frame generator 112 stops filtering the currently selected column. At this point, if not all of the columns in the block have been selected, the frame generator 112 returns to the step 2220 to filter the next column in the block. Otherwise, if all of the columns in the block have been filtered, the frame generator returns to the step 2218 to filter the next block.

Still referring to thee step 2224, if the variable "filter_strength" is greater than zero, the frame generator 112 proceeds to a step 2228 and filters the pixel referenced by the variables "filter1" and "filter2." The frame generator 112 assigns the pixel referenced by the variable "filter1" to equal the average of the pixel values itself and of its neighbors to the above and below. Further, the frame generator 112 assigns the pixel referenced by the variable "filter2" to equal the average of the pixel values of itself and of its neighbors to the above and below. The frame generator 112 then divides the variable "filter_strength" by 2, rounding down. Next, the frame generator 112 reassigns the variable "filter1" to reference the pixel that is immediately above of the pixel that is referenced by "filter1." Further, the frame generator 112 reassigns the variable "filter2" to reference the pixel that is immediately below the pixel that is currently referenced by the variable "filter2." The frame generator 112 then returns to the step 2224 and continues to filter the pixels in the selected row until the filter strength is equal to zero. At this point, the frame generator 112 returns to the step 2220, to filter the next pixel in the column.

Advantageously, the frame generator 112 of the present invention performs extensive analysis regarding first and second base frames to determine the appropriateness of frame generation. If frame generation would likely cause an anomalous result, frame generation is not performed. Also, if used in conjunction with a motion compensated interpolation system, the frame generator 112 performs global motion vector correction, thereby ensuring that each of the motion vectors represent movement.

Furthermore, the frame generator 112 can detect the presence of text in the first and base frames. If such text is detected, the frame generator maintains the positioning of the text in the generated frames. This is to be contrasted with more simplistic solutions which perform frame generation heedless of the presence of text.

In addition, the frame generator 112 filters the generated frames. Such filtering provides a more pleasing presentation than in presentations having unfiltered frames.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of generating video frames, the method comprising:

receiving a first frame in a memory in an electronic device;

receiving a second frame in the memory in the electronic device;

determining whether to generate an intermediate frame between the first frame and the second frame, wherein determining whether to generate the intermediate frame includes determining whether the second frame is a key frame; and generating, depending on the step of determining, at least one intermediate frame based on elements of the first frame and/or the second frame.

2. The method of claim 1, wherein each of the elements are macroblocks having a plurality of rows and columns of pixels, each of the pixels having an associated intensity value.

3. The method of claim 1, additionally comprising the steps of:

receiving time interval data indicative of the presentation timing of the first frame and the second frame; and determining whether the difference in time between the first frame and the second frame is greater than a threshold.

4. The method of claim 3, wherein the magnitude of the threshold is based, at least in part, on the value of a quantizer associated with the first frame and/or the second frame.

5. A system for generating video frames, the system comprising:

means for receiving a first frame in a memory in the computer system;

means for receiving a second frame in the memory in the computer system;

means for determining whether to generate an intermediate frame between the first frame and the second frame, wherein determining whether to generate the intermediate frame includes determining whether the second frame is a key frame; and means for generating, depending on the step of determining, at least one intermediate frame based upon elements of the first frame and the second frame.

6. The system of claim 5, wherein each of the elements is a macroblock having a plurality of rows and columns of pixels, each of the pixels having an associated intensity value.

7. The system of claim 5, wherein the magnitude of the threshold is based, at least in part, on the value of a quantizer associated with the first frame and/or the second frame.

8. In a computer system, a method of generating video frames, the method comprising:

receiving a first frame having a plurality of macroblocks in a memory in the computer system, the first frame representative of a video image at a first instance in time, each macroblock having a plurality of rows and columns of pixels, each of the pixels having an associated intensity value;

receiving a second frame having a plurality of macroblocks in the memory in the computer system, the second frame representative of a video image at a second instance in time, each macroblock having a plurality of rows and columns of pixels, each of the pixels having an associated intensity value; and determining whether to generate an intermediate frame between the first frame and the second frame, the determining comprising the steps of:
  receiving time interval data indicative of the presentation timing of the first frame and the second frame, and
  determining whether the difference in time between the first frame and the second frame is greater than a threshold wherein the magnitude of the threshold is based, at least in part, on the value of a quantizer; and
  generating, depending on the step of determining, at least one intermediate frame based upon the macroblocks of the first frame and the second frame.

9. A system for generating video frames, the system comprising:
  a frame analysis module for receiving frames; and
  a frame synthesis module for determining whether the generation of one or more frames between two received frames provides for a smoother visual presentation than without the frame generation, wherein the determining is based at least in part upon whether one of the received frames is a key frame.

10. The system of claim 9, wherein the frame synthesis module generates one or more frames between two received frames.

11. In a computer system, a method of generating video frames, the method comprising:
  receiving a first frame in a memory in the computer system, the first frame comprising a first set of elements;
  receiving a second frame in the memory in the computer system, the second frame comprising a second set of elements;
  selecting one of a plurality of frame generation methods based upon information in the first frame and/or second frame, wherein one of the selectable frame generation methods includes positioning an element for inclusion in a generated frame based upon a motion vector that is associated with the first or second frames; and
  applying the selected frame generation method to generate at least one intermediate frame based upon the first set of elements and/or the second set of elements.

12. The method of claim 11, wherein the frame generation method is selected from the group comprising: motion compensated interpolation and linear interpolation.

13. The method of claim 12, wherein one or more of the first set of elements and the second set of elements has an associated motion vector.

14. The method of claim 13, wherein selecting a frame generation method includes:
  determining whether, any of the motion vectors exceeds a threshold; and
  selecting motion compensated interpolation as the method for frame generation if any of the motion vectors exceeds the threshold.

15. The method of claim 13, wherein selecting a frame generation method comprises the steps of:
  for a group of the one or more elements of the first and second set of elements, identifying with respect to each member element in the group another proximately positioned element in the group;
  determining the average distance between the motion vector associated with the respective member element and the motion vector associated with said proximately positioned element;
  summing the average distances; and
  selecting motion compensated interpolation if the summed total is less than a threshold.

16. A system for generating video frames, the system comprising:
  means for receiving a first frame in a memory in the computer system, the first frame comprising a first set of elements;
  means for receiving a second frame in the memory in the computer system, the second frame comprising a second set of elements;
  means for selecting one of a plurality of frame generation methods based upon the first frame and/or second frame, wherein one of the selectable frame generation methods includes positioning an element for inclusion in a generated frame based upon a motion vector that is associated with the first or second frames; and
  means for applying the selected frame generation method to generate at least one intermediate frame based upon the first set of elements and/or the second set of elements.

17. The method of claim 16, wherein the frame generation method is selected from the group comprising: motion compensated interpolation and linear interpolation.

18. The system of claim 16, wherein one or more of the first set of elements and the second set of elements has an associated motion vector.

19. The system of claim 18, wherein the means for selecting a frame generation method includes:
  means for determining whether any motion vector exceeds a threshold; and
  means for selecting motion compensated interpolation as the method for frame generation if any of the motion vectors exceeds the threshold.

20. In a computer system, a method of generating video frames, the method comprising:
  receiving a first frame in a memory in the computer system;
  receiving a second frame in the memory in the computer system;
  determining whether to generate an intermediate frame between the first frame and the second frame, wherein determining whether to generate the intermediate frame includes:
    receiving time interval data indicative of the presentation timing of the first frame and the second frame, and
    determining whether the difference in time between the first frame and the second frame is greater than a threshold; and
    generating, depending on the step of determining, at least one intermediate frame based on elements of the first frame and/or the second frame.

21. The method of claim 20, wherein the magnitude of the threshold is based, at least in part, on the value of a quantizer associated with the first frame and/or the second frame.

22. The method of claim 20, wherein each of the elements of the second frame is either independently coded or has an associated motion vector, and wherein determining whether to generate the intermediate frame includes determining whether the number of independently coded elements of the second frame exceeds a predefined threshold.

23. In a computer system, a method of generating video frames, the method comprising:

receiving a first frame in a memory in the computer system;

receiving a second frame in the memory in the computer system, wherein each of the elements of the second frame is either independently coded or has an associated motion vector;

determining whether to generate an intermediate frame between the first frame and the second frame and whether the number of independently coded elements of the second frame exceeds a predefined threshold; and generating, depending on the step of determining, at least one intermediate frame based on elements of the first frame and/or the second frame.

24. The method of claim 23, wherein the magnitude of the threshold is based, at least in part, on the value of a quantizer associated with the first frame and/or the second frame.

25. The method of claim 23, wherein each of the elements are macroblocks having a plurality of rows and columns of pixels, each of the pixels having an associated intensity value.

26. In a computer system, a method of generating video frames, the method comprising:

receiving a first frame in a memory in the computer system;

receiving a second frame in the memory it the computer system, wherein each of the elements of the second frame is either independently coded or has an associated motion vector;

determining whether to generate an intermediate frame between the first frame and the second frame and whether the maximum motion vector in the second frame exceeds a predefined threshold; and generating, depending on the step of determining, at least one intermediate frame based on elements of the first frame and/or the second frame.

27. The method of claim 26, wherein the magnitude of the threshold is based, at least in part, on the value of a quantizer associated with the first frame and/or the second frame.

28. The method of claim 26, wherein each of the elements is a macroblock having a plurality of rows and columns of pixels, each of the pixels having an associated intensity value.

29. A system for generating video frames, the system comprising:

means for receiving a first frame in a memory in the computer system;

means for receiving a second frame in the memory in the computer system;

means for determining whether to generate an intermediate frame between the first frame and the second frame, the means for determining comprising:

means for receiving time interval data indicative of the presentation timing of the first frame and the second frame, and means for determining whether to generate the intermediate frame includes determining whether the difference in time between the first frame and the second frame is greater than a threshold; and means for generating, depending on the step of determining, at least one intermediate frame based upon elements of the first frame and the second frame.

30. The system of claim 29, wherein each of the elements is a macroblock having a plurality of rows and columns of pixels, each of the pixels having an associated intensity value.

31. The system of claim 29, wherein the magnitude of the threshold is based, at least in part, on the value of a quantizer associated with the first frame and/or the second frame.

32. The system of claim 29, wherein each of the elements of the second frame are either independently coded or have an associated motion vector, and wherein determining whether to generate the intermediate frame includes determining whether the number of independently coded elements of the second frame exceeds a predefined threshold.

33. The system of claim 29, wherein each of the elements of the second frame are either independently coded or have an associated motion vector, and wherein determining whether to generate the intermediate frame includes determining whether the maximum motion vector in the second frame exceeds a predefined threshold.

34. A system for generating video frames, the system comprising:

means for receiving a first frame in a memory in the computer system;

means for receiving a second frame in the memory in the computer system;

means for determining whether to generate an intermediate frame between the first frame and the second frame, wherein each of the elements of the second frame are either independently coded or have an associated notion vector, and wherein determining whether to generate the intermediate frame includes determining whether the number of independently coded elements of the second frame exceeds a predefined threshold; and means for generating, depending on the step of determining, at least one intermediate frame based upon elements of the first frame and the second frame.

35. The system of claim 34, wherein each of the elements is a macroblock having a plurality of rows and columns of pixels, each of the pixels having an associated intensity value.

36. The system of claim 34, wherein the magnitude of the threshold is based, at least in part, on the value of a quantizer associated with the first frame and/or the second frame.

37. The system of claim 34, wherein each of the elements of the second frame are either independently coded or have an associated motion vector, and wherein determining whether to generate the intermediate frame includes determining whether the number of independently coded elements of the second frame exceeds a predefined threshold.

38. A system for generating video frames, the system comprising:

means for receiving a first frame in a memory in the computer system;

means for receiving a second frame in the memory in the computer system, wherein each of the elements of the second frame are either independently coded or have an associated motion vector;

means for determining whether to generate an intermediate frame between the first frame and the second frame, wherein determining whether to generate the intermediate frame includes determining whether the maximum motion vector in the second frame exceeds a predefined threshold; and means for generating, depending on the step of determining, at least one intermediate frame based upon elements of the first frame and the second frame.

39. The system of claim 38, wherein each of the elements is a macroblock having a plurality of rows and columns of pixels, each of the pixels having an associated intensity value.

40. The system of claim 38, wherein the magnitude of the threshold is based, at least in part, on the value of a quantizer associated with the first frame and/or the second frame.

41. A program storage device storing instructions that when executed:

receiving a first frame in a memory in the computer system;

receiving a second frame in the memory in the computer system, wherein each of the elements of the second frame is either independently coded or has an associated motion vector;

determining whether to generate an intermediate frame between the first frame and the second frame by determining whether the maximum motion vector in the second frame exceeds a predefined threshold; and generating, depending on the step of determining whether to generate an intermediate frame, at least one intermediate frame based on elements of the first frame and/or the second frame.

42. The program storage device of claim 41, wherein the magnitude of the threshold is based, at least in part, on the value of a quantizer associated with the first frame and/or the second frame.

43. The program storage device of claim 41, wherein each of the elements are macroblocks having a plurality of rows and columns of pixels, each of the pixels having an associated intensity value.

44. A method comprising:

receiving a first frame in a memory in a computing device;

receiving a second frame in the memory in the computer system, wherein each of the elements of the second frame is either independently coded or has an associated motion vector;

determining whether to generate an intermediate frame between the first frame and the second frame, independent of a frame rate of the first and second frames, wherein the determining is based upon the magnitude of a threshold that is set as a function of, at least in part, a quantizer value that is related to the first frame and/or the second frame; and generating, depending on the step of determining, at least one intermediate frame based on elements of the first frame and/or the second frame.

45. The method of claim 44, wherein each of the elements are macroblocks having a plurality of rows and columns of pixels, each of the pixels having an associated intensity value.

46. A method comprising:

receiving a first frame in a memory in a computing device;

receiving a second frame in the memory in the computer device, wherein each of the elements of the second frame is either independently coded or has an associated motion vector;

determining whether to generate an intermediate frame between the first frame and the second frame based upon: a) the content of one of the elements in the first or second frame and b) the magnitude of a threshold that is set as a function of, at least in part, a quantizer value that is related to the first frame and/or the second frame; and generating, depending on the step of determining, at least one intermediate frame based on elements of the first frame and/or the second frame.

47. The method of claim 46, wherein each of the elements are macroblocks having a plurality of rows and columns of pixels, each of the pixels having an associated intensity value.

48. In a computer system, a method of generating video frames, the method comprising:

receiving a first frame in a memory in the computer system, the first frame comprising a first set of elements;

receiving a second frame in the memory in the computer system, the second frame comprising a second set of elements, wherein one or more of the first set of elements and the second set of elements has an associated motion vector;

selecting a frame generation method based upon information in the first frame and/or second frame; and applying the selected frame generation method to generate at least one intermediate frame based upon the first set of elements and/or the second set of elements, wherein selecting a frame generation method includes:

for a group of the one or more elements of the first and second set of elements, identifying with respect to each member element in the group another proximately positioned element in the group;

determining the average distance between the motion vector associated with the respective member element and the motion vector associated with said proximately positioned element;

summing the average distances; and selecting motion compensated interpolation if the summed total is less than a threshold.

49. The method of claim 48, wherein the element comprises a macroblock.

* * * * *